US010767722B2

(12) United States Patent
Inoue

(10) Patent No.: US 10,767,722 B2
(45) Date of Patent: Sep. 8, 2020

(54) MOUNT FOR SUBFRAME

(71) Applicant: HONDA MOTOR CO., LTD., Minato-ku, Tokyo (JP)

(72) Inventor: Toshio Inoue, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 60 days.

(21) Appl. No.: 16/206,242

(22) Filed: Nov. 30, 2018

(65) Prior Publication Data

US 2019/0170206 A1 Jun. 6, 2019

(30) Foreign Application Priority Data

Dec. 4, 2017 (JP) ................................ 2017-232464

(51) Int. Cl.

*F16F 9/53* (2006.01)
*B62D 27/04* (2006.01)
*B62D 21/11* (2006.01)

(52) U.S. Cl.

CPC .............. *F16F 9/535* (2013.01); *B62D 27/04* (2013.01); *B62D 21/11* (2013.01); *F16F 2222/12* (2013.01); *F16F 2224/045* (2013.01); *F16F 2228/066* (2013.01); *F16F 2234/02* (2013.01)

(58) Field of Classification Search

CPC ...... F16F 9/535; F16F 13/305; F16F 2230/18; F16F 9/53; F16F 2222/06; F16F 9/532; F16F 2224/045; F16F 1/361; F16F 13/105; F16F 15/03; F16F 2224/043; F16F 13/30; B60G 2204/128; B60G 2401/17; B62D 27/04

See application file for complete search history.

(56) References Cited

U.S. PATENT DOCUMENTS 5,116,029 A * 5/1992 Gennesseaux ........ F16F 13/264 267/140.14
5,176,368 A * 1/1993 Shtarkman .............. F16F 13/16 188/267.2

(Continued)

FOREIGN PATENT DOCUMENTS

JP 2003-065384 A 3/2003
JP 2006-077787 A 3/2006
JP 2017-203494 A 11/2017

OTHER PUBLICATIONS

Office Action dated May 21, 2019 issued over the corresponding Japanese Patent Application No. 2017-232464 with the English translation thereof.

(Continued)

*Primary Examiner* — Bradley T King
*Assistant Examiner* — Mahbubur Rashid
(74) *Attorney, Agent, or Firm* — Carrier Blackman & Associates, P.C.; William D. Blackman; Joseph P. Carrier

(57) ABSTRACT

Flows of magnetorheological fluid inside a mount are controlled to be stopped in the direction of the axis of the mount and in directions perpendicular to the axis by applying coil excitation current to an exciting coil, and thus the elastic properties of the mount are adjusted such that the mount is hardened in the axial direction and in the directions perpendicular to the axis. As a result, a variable damping force can be exerted on the external forces applied to the mount in the axial direction and in the directions perpendicular to the axis.

5 Claims, 17 Drawing Sheets

(56) References Cited

U.S. PATENT DOCUMENTS

| | | | | |
|---|---|---|---|---|
| 5,284,330 | A * | 2/1994 | Carlson | F16F 9/535 188/267.2 |
| 5,427,347 | A * | 6/1995 | Swanson | F16F 13/264 248/562 |
| 5,492,312 | A * | 2/1996 | Carlson | F16F 9/535 188/267.2 |
| 5,570,286 | A * | 10/1996 | Margolis | B60N 2/501 701/36 |
| 5,957,440 | A * | 9/1999 | Jones | F16F 7/1005 244/54 |
| 6,412,761 | B1 * | 7/2002 | Baudendistel | F16F 13/105 267/140.14 |
| 10,161,467 | B2 | 12/2018 | Terashima et al. | |
| 2003/0037997 | A1 * | 2/2003 | Sakata | F16F 13/305 188/71.5 |
| 2003/0070892 | A1 * | 4/2003 | Iyengar | F16F 9/52 188/267.2 |
| 2009/0276098 | A1 * | 11/2009 | Bodie | F16F 13/305 700/280 |
| 2012/0132492 | A1 * | 5/2012 | Kim | F16F 13/305 188/267.2 |
| 2013/0032229 | A1 * | 2/2013 | Kim | F16F 13/305 137/561 A |

OTHER PUBLICATIONS

Office Action including search report dated Apr. 17, 2020 issued over the corresponding Chinese Patent Application No. 201811475078.3 with the English translation thereof.

* cited by examiner

MOUNT FOR SUBFRAME

CROSS-REFERENCE TO RELATED APPLICATION

This application is based upon and claims the benefit of priority from Japanese Patent Application No. 2017-232464 filed on Dec. 4, 2017, the contents of which are incorporated herein by reference.

BACKGROUND OF THE INVENTION

Field of the Invention

The present invention relates to a mount for a subframe enclosing a magnetorheological fluid (MRF), a fluid containing a magnetorheological compound (MRC), or other similar materials in a fluid tight manner and disposed on the subframe at a position where the subframe is supported by vehicle body.

Description of the Related Art

For example, Japanese Laid-Open Patent Publication No. 2006-077787 (hereinafter referred to as "JPA 2006-077787") discloses a damper with variable damping force using a magnetorheological fluid of which viscosity changes according to effects of a magnetic field (FIG. 2 in JPA 2006-077787).

The damper with variable damping force encloses the magnetorheological fluid inside a cylinder and generates viscous drag or damping force by sliding a piston plate inside the cylinder.

The piston plate has orifices serving as paths of the magnetorheological fluid above and below the piston plate.

In addition, a coil is disposed adjacent to the orifices and is supplied with current from an external power source to generate magnetic flux crossing the orifices.

The magnetic flux increases local viscosity of the magnetorheological fluid passing through the orifices and thus increases the damping force against the movement of the piston plate.

In this manner, predetermined damping characteristics can be achieved in the axial (vertical) direction within an adjustment range by adjusting the strength of the magnetic field to be applied from the outside.

SUMMARY OF THE INVENTION

The above-described damper with variable damping force, however, can resist external forces only in the vertical direction. in a case of providing a mount at a position where the subframe is supported by a vehicle body, such a damper cannot be applied to the mount disposed on a subframe, on which, for example, a driving source of a vehicle is mounted, since external forces in the longitudinal and transverse directions of the vehicle, that is, in directions perpendicular to the axial direction (hereinafter referred to as "axis-perpendicular directions") are applied to the mount in addition to the external forces in the axial (vertical) direction.

The present invention has been devised taking into consideration the aforementioned problems, and has the object of providing a mount for a subframe capable of exerting a variable damping force or a variable stiffness on external forces in the axial (vertical) direction and the axis-perpendicular directions (the longitudinal and transverse directions).

A mount for a subframe according to the present invention, having a cylindrical shape, containing magnetorheological fluid in a fluid tight manner, and disposed on the subframe at a position where the subframe is supported by a vehicle body, includes:

upper and lower fluid chambers;

a middle fluid chamber, including an axial path extending in a direction of an axis of the mount and an axis-perpendicular path extending in directions perpendicular to the axis, disposed between the upper and lower fluid chambers; and a magnetic member; wherein:

one end of the axial path communicates with one of the upper and lower fluid chambers, another end of the axial path communicates with one end of the axis-perpendicular path, and another end of the axis-perpendicular path communicates with the other of the upper and lower fluid chambers; and the magnetic member forms magnetic paths passing through the axial path of the middle fluid chamber in the directions perpendicular to the axis and passing through the axis-perpendicular path, in the direction of the axis when excitation current is applied to a coil wound about the axis.

According to the present invention, flows of the magnetorheological fluid are controlled to be stopped in the axial path and in the axis-perpendicular path inside the mount by the magnetic paths formed by applying the excitation current to the coil, and thus the elastic properties of the mount are adjusted such that the mount is hardened in the direction of the axis (vertical direction) and in the directions perpendicular to the axis (longitudinal and transverse directions).

As a result, a variable damping force can be exerted on external forces applied to the mount in the direction of the axis and in the directions perpendicular to the axis.

In addition, the magnetorheological fluid does not flow between the upper and lower fluid chambers without passing through the middle fluid chamber in which the magnetic paths are formed. Consequently, the elastic properties of the mount can be efficiently changed by changing the magnitude of the magnetic field of the magnetic paths in the middle fluid chamber.

Moreover, a mount for a subframe according to the present invention, having a cylindrical shape and disposed on the subframe at a position where the subframe is supported by a vehicle body, includes:

an inner cylinder including a hollow shaft portion for fastening the mount to the vehicle body;

an outer cylinder disposed to be coaxial with the inner cylinder;

a coil having a cylindrical shape secured adjacent to the inner cylinder;

first and second elastic members each having an annular shape, respectively disposed in upper and lower portions of the mount, and holding a magnetorheological fluid inside the mount in a fluid tight manner, wherein:

a first fluid chamber and a third fluid chamber accommodating the magnetorheological fluid are respectively disposed in the upper and lower portions inside the mount;

a second fluid chamber accommodating the magnetorheological fluid is disposed between the first fluid chamber and the third fluid chamber;

the second fluid chamber includes an axial path, extending in a direction of an axis of the mount and communicating with the first fluid chamber, and an axis-perpendicular path, extending in directions perpendicular to the axis and communicating with the axial path and the third fluid chamber; and a first magnetic member is secured to an outer circumference of the inner cylinder and a second magnetic member is secured to an inner circumference of the outer cylinder such that magnetic paths passing through the axial path of the second fluid chamber in the directions perpendicular to the axis and passing through the axis-perpendicular path in the direction of the axis are formed when excitation current is applied to the coil.

According to the present invention, flows of the magnetorheological fluid are controlled to be stopped in the direction of the axis and in the directions perpendicular to the axis of the mount by applying the excitation current to the coil, and thus the elastic properties of the mount are adjusted such that the mount is hardened in the direction of the axis and in the directions perpendicular to the axis.

As a result, a variable damping force or a variable stiffness can be exerted on the external forces applied to the mount in the direction of the axis (vertical direction) and in the directions perpendicular to the axis (longitudinal and transverse directions).

In addition, the magnetorheological fluid does not flow between the first fluid chamber and the third fluid chamber without passing through the second fluid chamber in which the magnetic paths are formed. Consequently, the elastic properties of the mount can be efficiently changed by changing the magnitude of the magnetic field of the magnetic paths in the second fluid chamber.

In this case, the axial path and the axis-perpendicular path of the second fluid chamber form a crank-like shape when the mount is viewed in longitudinal section;

the magnetic paths in the directions perpendicular to the axis are formed radially in the directions perpendicular to the axis; and the magnetic paths in the direction of the axis are formed throughout the entire circumference of the axis.

According to this structure, the axial path and the axis-perpendicular path of the second fluid chamber through which the magnetorheological fluid passes are symmetrical with respect to the axis, and thus the elastic properties are adjusted to be uniform in the radial direction of the second fluid chamber.

Here, a volume of the second fluid chamber may be smaller than a volume of the first fluid chamber and than a volume of the third fluid chamber.

The second fluid chamber with a volume smaller than the volumes of the first fluid chamber and the third fluid chamber enables the formed magnetic paths to be compact, and thus the elastic properties can be changed while the power efficiency in forming the magnetic paths using the exciting coil is improved.

Moreover, a stiffness of one of the first and second elastic members, each having the annular shape, respectively disposed in the upper and lower portions of the mount, and holding the magnetorheological fluid inside the mount in a fluid tight manner, may be lower than a stiffness of the other.

That is, one of the elastic members with a stiffness lower than the stiffness of the other forms a diaphragm. When the fluid pressures in the fluid chambers are increased, the diaphragm expands to absorb the fluid pressures. This allows the stiffness of the mount to set to low in a state where no magnetic field is applied, and allows variable magnifications of the stiffness or the damping of the mount to be increased when a magnetic field is applied while the internal pressures in the fluid chambers, that is, the internal pressure in the mount is prevented from being increased. This prevents the mount from getting fatigued, leading to a longer life span of the mount.

Furthermore, a plurality of partition members may radially extend to partition the first fluid chamber and the third fluid chamber into sectors of a hollow cylinder.

The partition members limit the ranges of flows of the magnetorheological fluid in the directions around the axis in the first fluid chamber and the third fluid chamber and direct the flows of the magnetorheological fluid generated in response to inputs in the directions perpendicular to the axis toward the second fluid chamber. This enables the viscosity or the stiffness of the mount for the subframe to be changed.

According to the present invention, the flows of the magnetorheological fluid are controlled to be stopped in the axial path and in the axis-perpendicular path inside the mount by the magnetic paths formed by applying the excitation current to the coil, and thus the elastic properties of the mount are adjusted such that the mount is hardened in the direction of the axis (vertical direction) and in the directions perpendicular to the axis (longitudinal and transverse directions).

As a result, a variable damping force or a variable stiffness can be exerted on the external forces applied to the mount in the direction of the axis and in the directions perpendicular to the axis.

In addition, the magnetorheological fluid does not flow between the upper and lower fluid chambers without passing through the middle fluid chamber in which the magnetic paths are formed. Consequently, the elastic properties of the mount can be efficiently changed by changing the magnitude of the magnetic field of the magnetic paths in the middle fluid chamber.

The above and other objects features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Preferred embodiments of a mount for a subframe according to the present invention will be described in detail below with reference to the accompanying drawings.

First Embodiment

[Structure]

Figure 1:
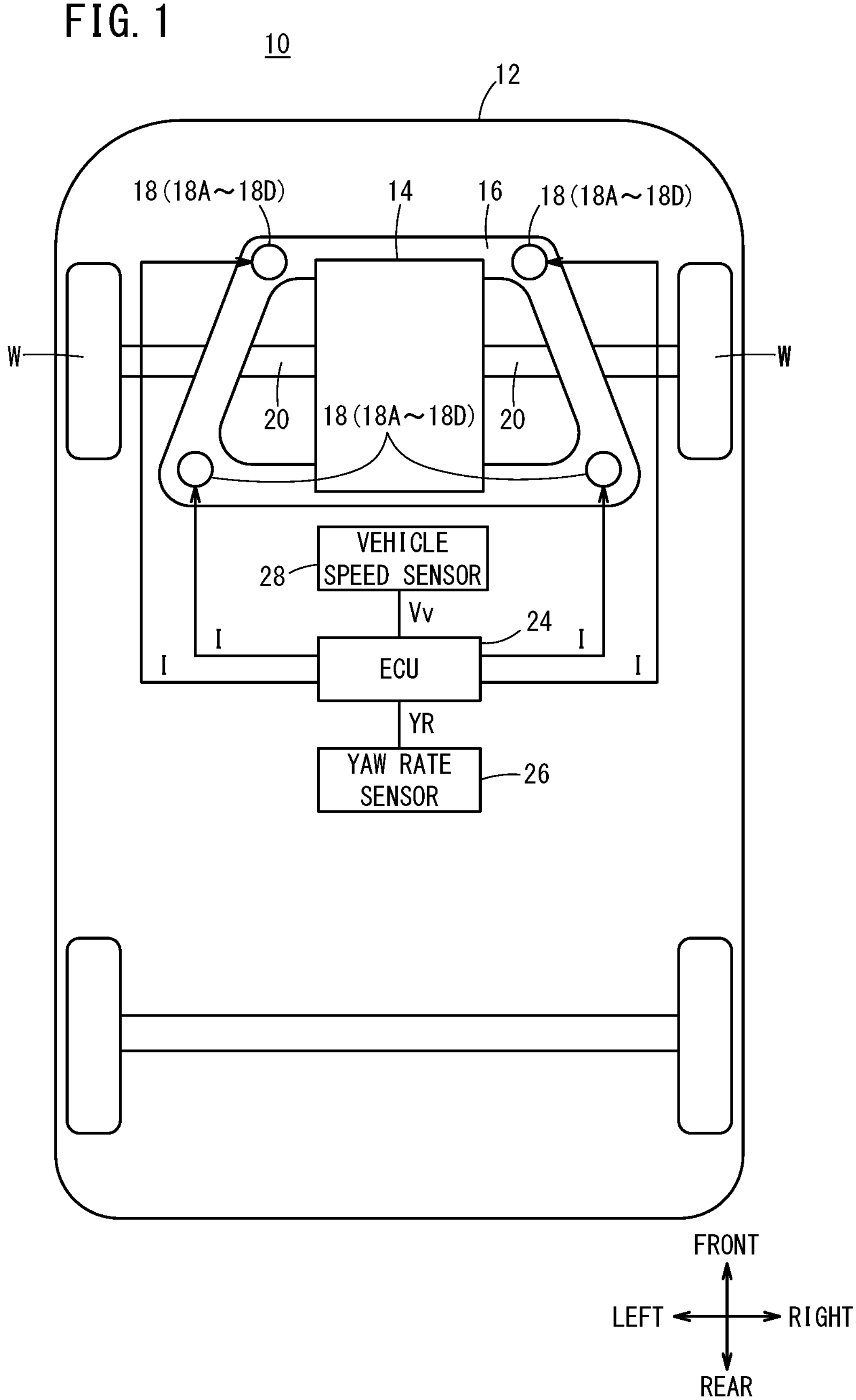
FIG. 1 is a schematic plan view of a vehicle to which a mount for a subframe according to the present invention is applied.

FIG. 1 is a schematic plan view of a vehicle 10 to which a mount for a subframe according to the present invention is applied.

The vehicle 10 includes an approximately rectangular subframe 16 in the front part of a vehicle body (main frame) 12. A component 14 including an internal combustion engine, an electric motor, a power generator, a differential gear, a fuel tank, and/or a transmission as appropriate is mounted on the subframe 16.

The subframe 16 is provided, at the four corners, with mounts 18 for a subframe according to this (first) embodiment (hereinafter also referred to as "mounts").

The subframe 16 is joined to the vehicle body (main frame) 12 via the mounts 18.

The component 14 mounted on the subframe 16 is partially connected to front wheels W via an axle 20. The front wheels W are steered wheels and are connected and suspended on the vehicle body (main frame) 12 and the subframe 16 by a suspension device (not illustrated). The front wheels W are connected to a steering wheel (not illustrated) via a rack mechanism and a steering shaft (both not illustrated).

The mounts 18 are connected with an electronic control unit (ECU) 24 serving as a controller and provided with coil excitation currents I by the ECU 24.

The coil excitation currents I are controlled by the ECU 24 to have values according to the yaw rate YR obtained by a yaw rate sensor 26 and/or the vehicle speed Vv obtained by a vehicle speed sensor 28 such as a wheel speed sensor. The sensors are disposed adjacent to the center of gravity of the vehicle body 12.

Figure 2:
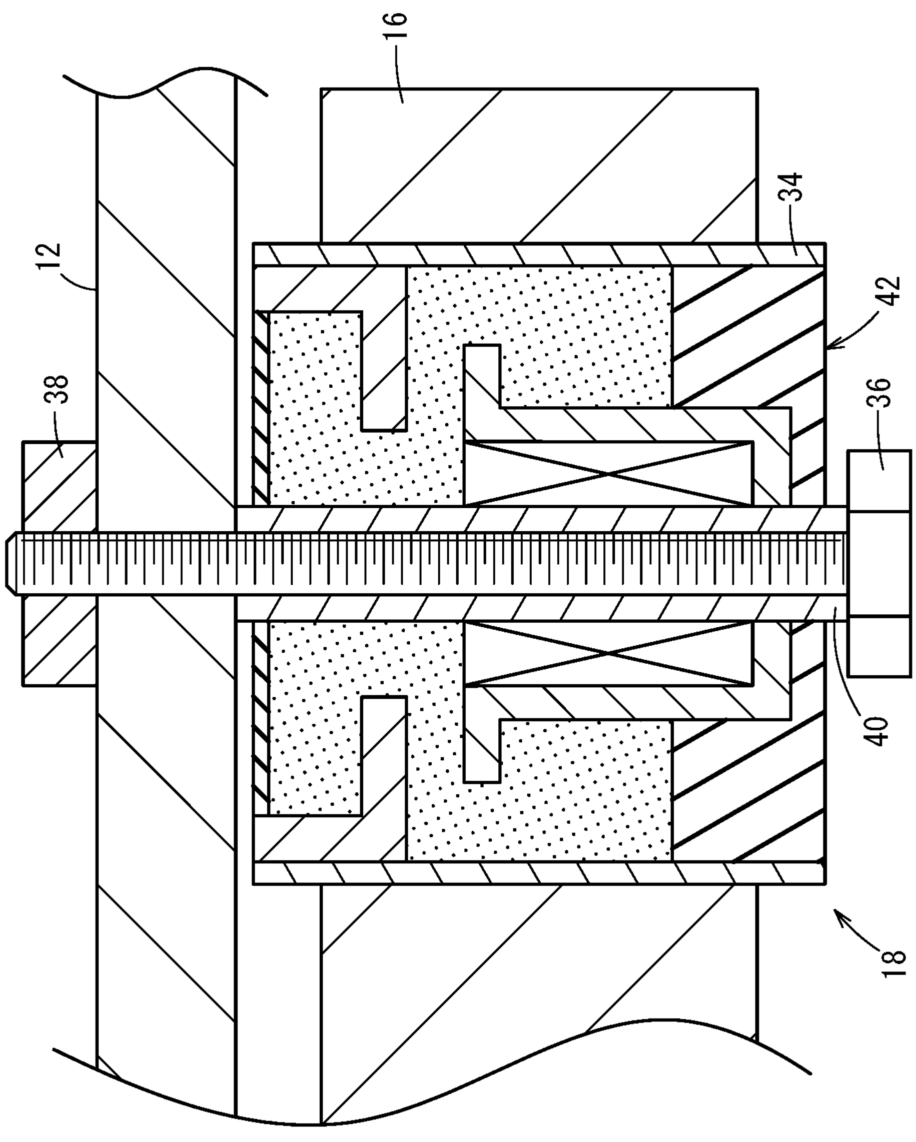
FIG. 2 is a partially omitted longitudinal sectional view illustrating how a mount for a subframe according to a first embodiment fastened to the subframe is mounted on a vehicle body (main frame)

FIG. 2 is a partially omitted longitudinal sectional view illustrating how each mount 18 fastened to the subframe 16 by, for example, insertion is mounted on the vehicle body (main frame) 12.

The mount 18 includes an outer cylinder 34 fitted in the subframe 16, an inner cylinder (for ease of understanding, also referred to as "inner cylindrical magnetic core") 40 composed of a magnetic body, and an internal mount structure 42 disposed between the inner cylinder 40 and the outer cylinder 34. The inner cylinder 40 has a hollow shaft portion in which a bolt (through-bolt) 36 is fitted, and is fastened to the vehicle body (main frame) 12 by the bolt 36 and a nut 38. The outer cylinder 34 is coaxially disposed on the radially outer side of the inner cylinder 40.

Figure 3:
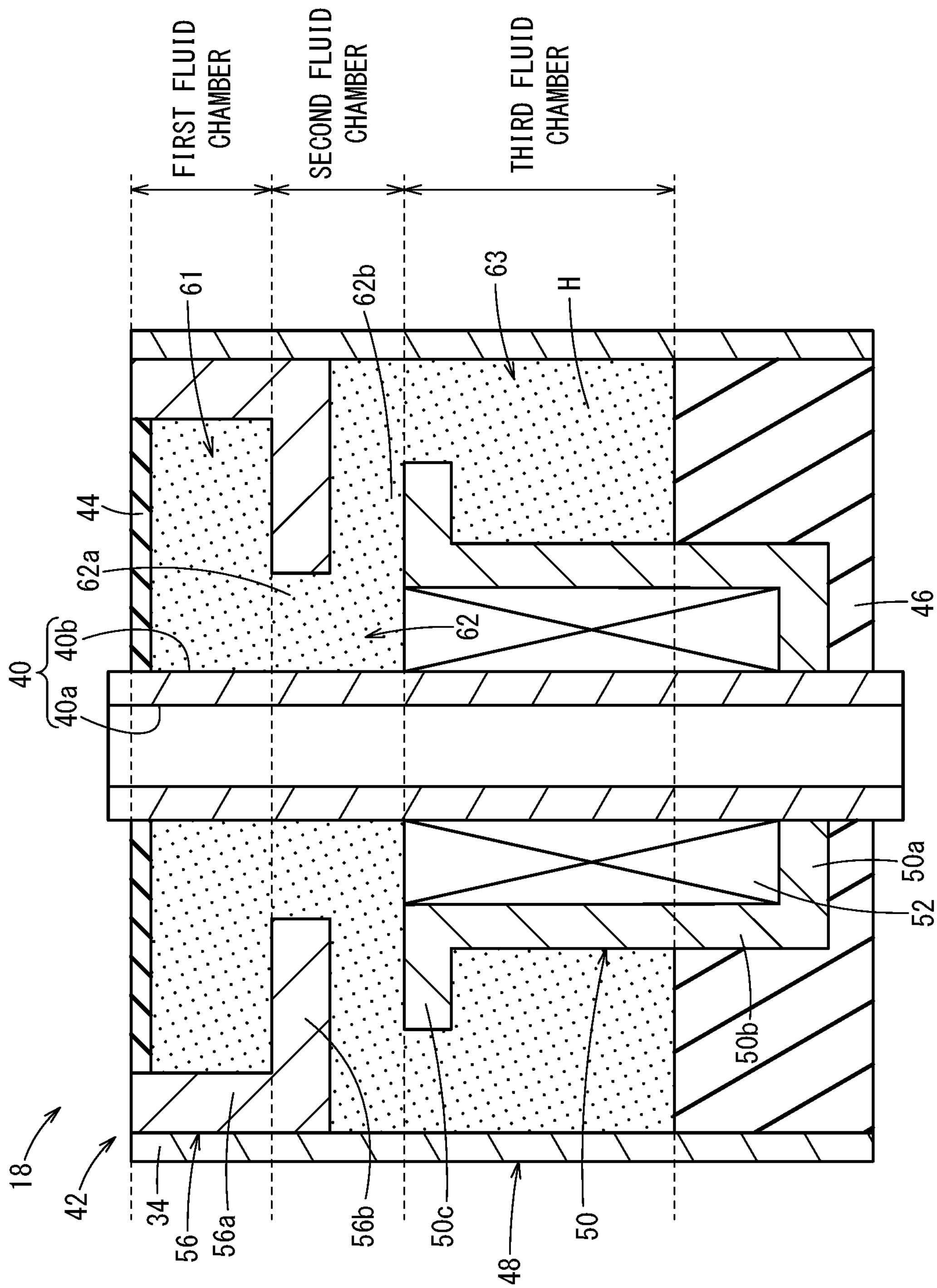
FIG. 3 is a longitudinal sectional view illustrating components of the mount for the subframe according to the first embodiment alone.

FIG. 3 is an enlarged longitudinal sectional view illustrating components of the internal mount structure 42 of the mount 18 alone.

As illustrated in FIG. 3, the mount 18 is provided with a housing 48 including the inner cylinder 40 composed of a magnetic body for fastening the mount to the vehicle body 12, the outer cylinder 34 fitted in the subframe 16, a diaphragm 44 serving as a first elastic member having an annular shape and covering an upper portion of the mount 18 to hold magnetorheological fluid H, and a main rubber 46 serving as a second elastic member having an annular shape and covering a lower portion of the mount 18 to hold the magnetorheological fluid H.

The inner cylindrical magnetic core 40 includes a bolt hole 40*a* and an outer circumferential wall 40*b* serving as a hollow shaft portion for fastening the mount to the vehicle body (main frame) 12.

An inner magnetic core 50 composed of a magnetic body is joined to the outer circumferential wall 40*b* of the inner cylindrical magnetic core 40.

The inner magnetic core 50 includes an annular core portion 50*a*, serving as a bottom portion, of which inner circumferential wall is joined to the outer circumferential wall 40*b* of the inner cylindrical magnetic core 40, a cylindrical core portion 50*b* of which lower surface is joined to the upper surface of the annular core portion 50*a* adjacent to the outer circumference, and a brim-shaped core portion 50*c* having a cylindrical shape extending radially outward and joined to the upper surface of the cylindrical core portion 50*b*.

The inner magnetic core 50 may be integrally molded.

A cylindrical exciting coil 52 is accommodated in a cylindrical space defined by the inner surface of the cylindrical core portion 50*b* and the outer circumferential wall 40*b* of the inner cylindrical magnetic core 40. The exciting coil 52 is secured adjacent to the inner cylinder 40 and generates a magnetic field with a strength according to the coil excitation current I supplied by the ECU 24.

An outer magnetic core 56 is joined to an upper portion of the outer cylinder 34.

Specifically, the outer circumferential wall of a cylindrical core portion 56*a* of the outer magnetic core 56 is joined to the inner circumferential wall of the outer cylinder 34. An annular core portion 56*b* is joined to the lower surface of the cylindrical core portion 56*a* such that part of the lower surface of the annular core portion 56*b* faces the upper surface of the brim-shaped core portion 50*c*. The outer circumferential wall of the annular core portion 56*b* is joined to the inner circumferential wall of the outer cylinder 34.

The outer magnetic core 56 may be integrally molded.

The inner space of the housing 48 of the mount 18 contains the magnetorheological fluid H such as magnetorheological fluid (MRF) or a fluid containing a magnetorheological compound (MRC) in a fluid tight manner.

In this case, a first fluid chamber 61 having a hollow cylindrical shape and accommodating the magnetorheological fluid H is defined in the upper portion of the mount 18 by the diaphragm 44 serving as the first elastic member having an annular shape, the cylindrical core portion 56*a* and the annular core portion 56*b* of the outer magnetic core 56, and the outer circumferential wall 40*b* of the inner cylindrical magnetic core 40.

In addition, a third fluid chamber 63 having a substantially hollow cylindrical shape and accommodating the magnetorheological fluid H is defined in the lower portion of the mount 18 by the main rubber 46 serving as the second elastic member having an annular (cylindrical) shape, the outer cylinder 34, and the cylindrical core portion 50*b* and the brim-shaped core portion 50*c* of the inner magnetic core 50.

A second fluid chamber 62 accommodating the magnetorheological fluid H is defined between the first fluid chamber 61 and the third fluid chamber 63 respectively defined in the upper and lower portions of the mount 18. An upper portion of the second fluid chamber 62 communicates with the first fluid chamber 61, and a lower portion communicates with the third fluid chamber 63.

The second fluid chamber 62 includes an axial path 62*a* extending in a direction of the axis of the mount (hereinafter referred to as "axial direction") and communicating with the first fluid chamber 61 and an axis-perpendicular path 62*b* extending in directions perpendicular to the axis (hereinafter referred to as "axis-perpendicular directions") and communicating with the axial path 62*a* and the third fluid chamber 63.

When the mount 18 is viewed in longitudinal section, the axial path 62*a* and the axis-perpendicular path 62*b* of the second fluid chamber 62 form a flange-like shape or a crank-like shape.

[Effects]

Next, the operational effects of the mount 18 enclosing the magnetorheological fluid H will be described.

[Description of Operational Effects of Magnetorheological Fluid Containing Structure with Basic Construction]

Figure 4A:
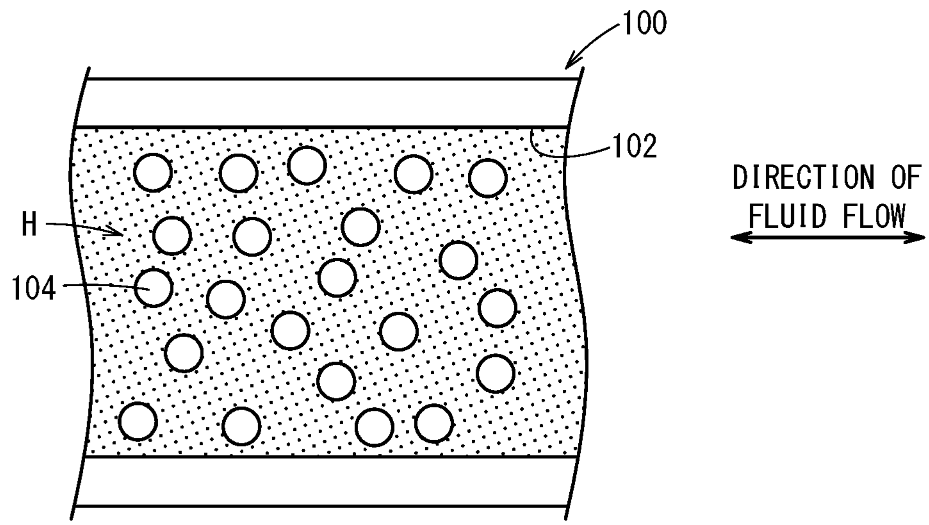
FIG. 4A is a distribution diagram of iron powder in a magnetorheological fluid containing structure in a state where no magnetic field is applied.
Figure 4B:
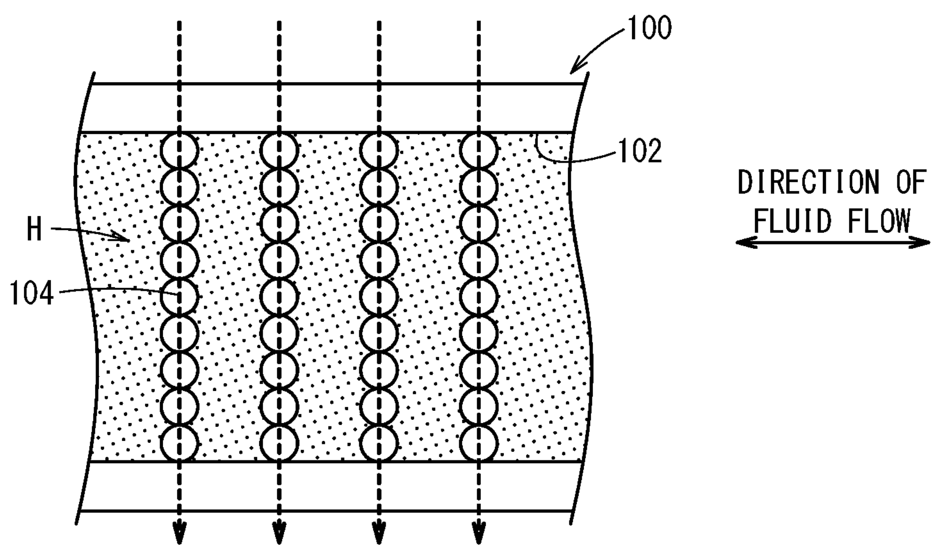
FIG. 4B is a distribution diagram of the iron powder in the magnetorheological fluid containing structure when a magnetic field is applied.

FIGS. 4A and 4B are schematic distribution diagrams illustrating the operational effects of a magnetorheological fluid containing structure 100 with a basic construction.

First, before the operational effects of the mount 18 are described, the operational effects of the magnetorheological fluid containing structure 100 with a basic construction will be described with reference to FIGS. 4A and 4B for ease of understanding.

FIG. 4A illustrates a state of the magnetorheological fluid containing structure 100 in a state where no magnetic field is applied.

In the magnetorheological fluid containing structure 100 illustrated in FIG. 4A, for example, iron powder 104 serving as magnetic particles move freely in the magnetorheological fluid H in a path 102. In this case, the viscosity of the magnetorheological fluid H acts as resistance in the direction of flow.

In a case where the magnetorheological fluid H is MRF, the magnetorheological fluid H functions as a fluid in which the iron powder 104 is dispersed. In a case where the magnetorheological fluid H is MRC, the magnetorheological fluid H functions as a thick, creamy compound, as is mayonnaise, in which the iron powder 104 is dispersed.

FIG. 4B illustrates a state of the magnetorheological fluid containing structure 100 when a magnetic field is applied to generate a magnetic flux indicated by broken line arrows crossing the path 102.

In the magnetorheological fluid containing structure 100, to which the magnetic field is applied, illustrated in FIG. 4B, the iron powder 104 forms valves along the magnetic field against the flow of the magnetorheological fluid H and functions as resistance, resulting in an increase in resistance in the direction of flow of the fluid.

In this manner, the apparent viscosity in the magnetorheological fluid containing structure 100 changes in proportion to the applied magnetic field.

Description of Operational Effects of Mount 18 for Subframe According to First Embodiment Next, the operational effects of the mounts 18 for the subframe according to this embodiment, disposed on the subframe 16 at positions where the subframe 16 is supported by the vehicle body (main frame) 12 and containing the magnetorheological fluid H in a fluid tight manner as illustrated in FIG. 2, will be described.

As described above, the component 14 mounted on the subframe 16 includes an internal combustion engine, a differential gear, an electric motor, a fuel tank, and the like. The subframe 16 has mounting points (fastening positions)

for a suspension system in addition to the component 14, and is joined to the vehicle body (main frame) 12 via the mounts 18.

Figure 5:
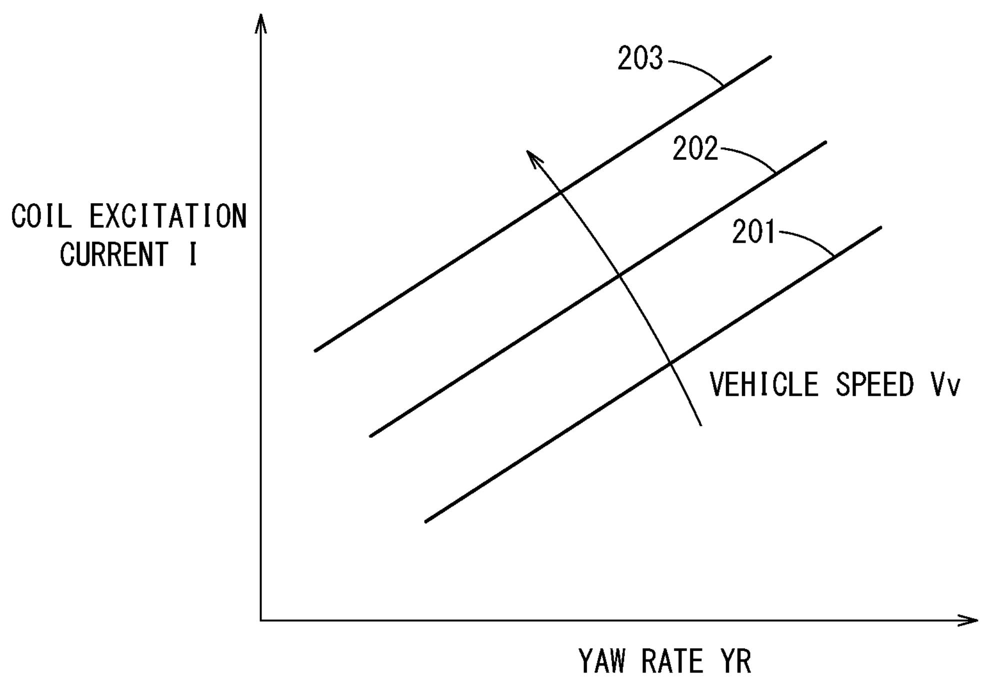
FIG. 5 is a characteristic diagram illustrating the value of coil excitation current with respect to the yaw rate and the vehicle speed.

As illustrated by example maps (characteristics) 201, 202, and 203 in FIG. 5, the ECU 24 controls the coil excitation current I of the exciting coil 52 such that the coil excitation current I increases as the yaw rate YR obtained by the yaw rate sensor 26 increases and as the vehicle speed Vv obtained by the vehicle speed sensor 28 increases to increase the resilience of the mounts 18. That is, the modulus of elasticity of the mounts 18 can be increased (changed).

Thus, for example, the coil excitation current I is set to zero or a small value to reduce the modulus of elasticity of the mounts 18 during traveling on a straight road or cruising on a freeway to prevent input of forced vibration from the internal combustion engine or the electric motor or input of vibration transmitted from the road surface to the vehicle body (main frame) 12 via the suspension. As a result, noise and vibration felt by occupants in the vehicle cabin are reduced and thus occupant comfort is improved.

On the other hand, the ECU 24 increases the coil excitation current I to harden (change the resilience of) the mounts 18 on a curve or a winding road. This improves the dynamic performance (turning performance) of the vehicle 10 and thus improves the controllability (handling performance) by the driver.

Figure 6:
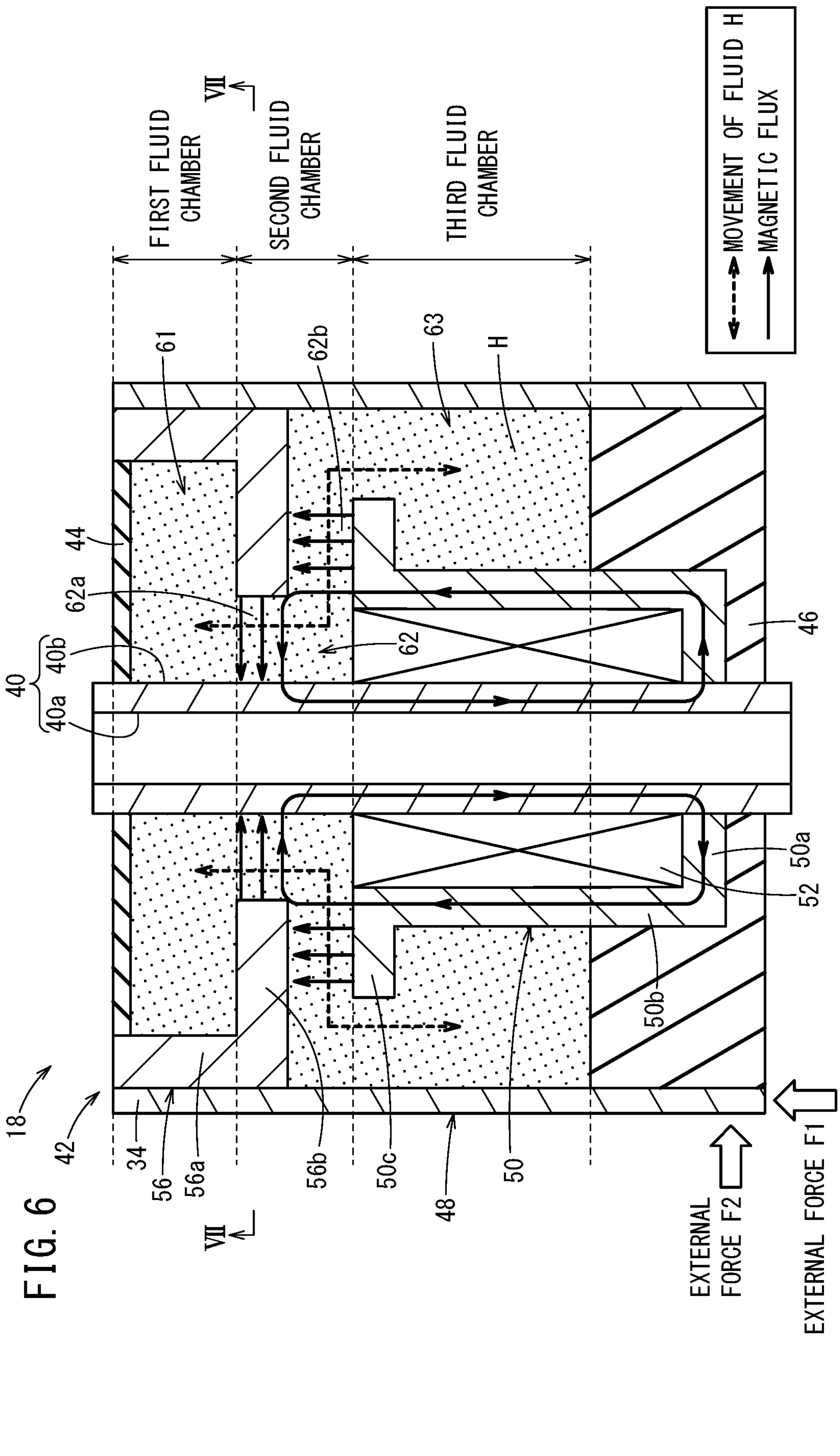
FIG. 6 is a longitudinal sectional view illustrating a magnetic field (magnetic paths) generated when an external force in the axial direction and an external force in a shear direction are applied to the mount for the subframe according to the first embodiment.

FIG. 6 illustrates the structure of the mount 18 and a magnetic field (magnetic flux), schematically illustrated by solid line arrows, generated by applying the coil excitation current I to the exciting coil 52 when an external force F1 in the axial direction and an external force F2 in a shear direction (axis-perpendicular direction) are applied to the mount 18.

Note that broken line arrows in FIG. 6 indicate directions in which the magnetorheological fluid H may move when the coil excitation current I is not applied.

Controlling the magnetic field by applying the coil excitation current I to the exciting coil 52 in response to the external force F1 in the axial (vertical) direction and the external force F2 in the axis-perpendicular direction (shear direction or the longitudinal or transverse direction of the vehicle) applied to the outer cylinder 34 of the mount 18 enables the resistance of the magnetorheological fluid H in the axial direction to be increased in the axial path 62*a* of the second fluid chamber 62.

Figure 7:
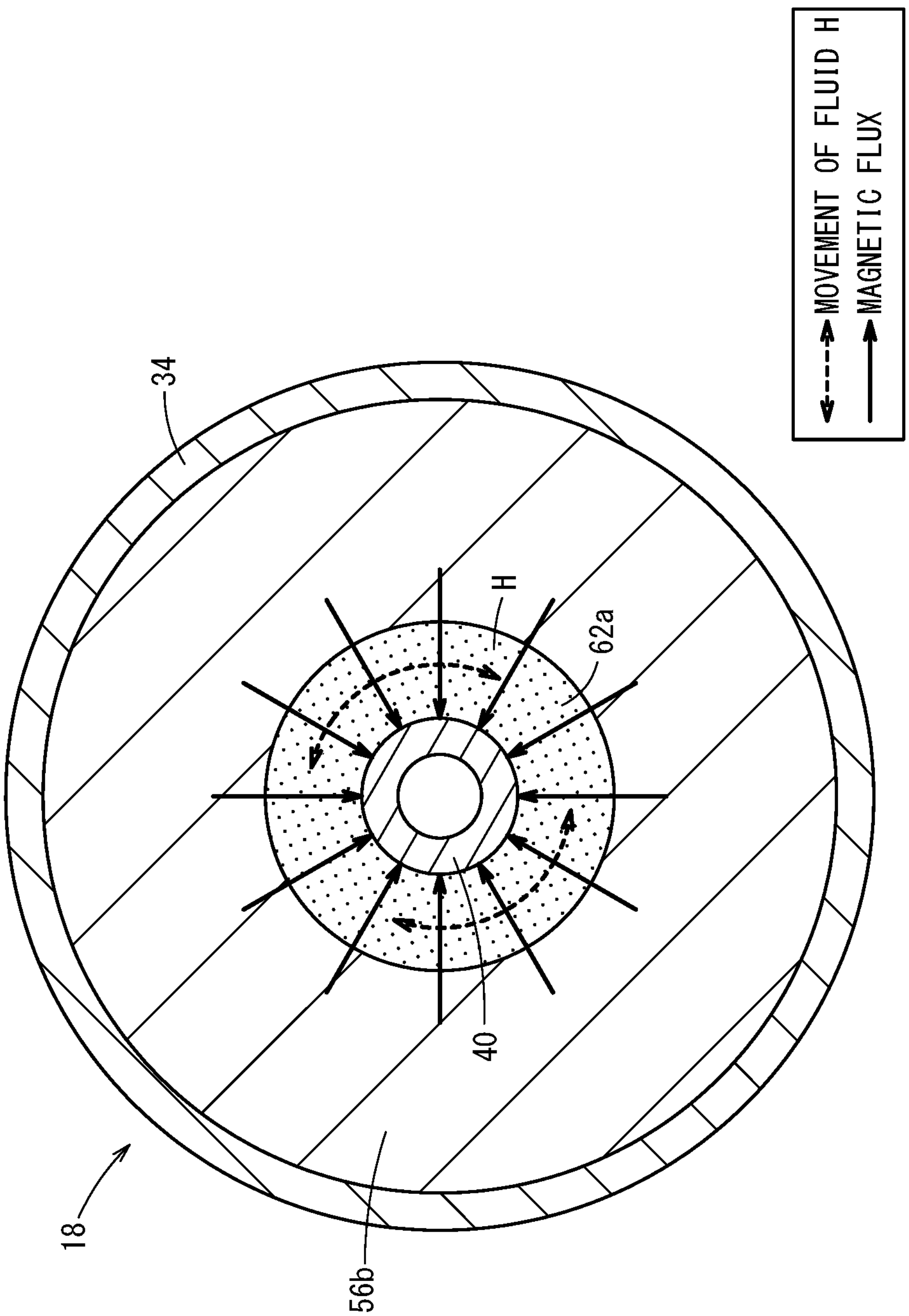
FIG. 7 is a cross-sectional view of the mount for the subframe according to the first embodiment taken along line VII-VII in FIG. 6.

As illustrated in FIG. 7 (cross-sectional view taken along line VII-VII in FIG. 6), radial magnetic paths (magnetic flux) are generated in the axial path 62*a* of the second fluid chamber 62 as indicated by solid line arrows to control flows of the magnetorheological fluid H in directions around the axis indicated by broken line arrows to be stopped.

In addition, as illustrated in FIG. 6, the resistance of the magnetorheological fluid H in the axis-perpendicular path 62*b* of the second fluid chamber 62 is also increased. Consequently, the flows of the magnetorheological fluid H between the second fluid chamber 62 and the first fluid chamber 61 and between the second fluid chamber 62 and the third fluid chamber 63 are controlled to be stopped.

Thus, both the flow rate from the first fluid chamber 61 to the second fluid chamber 62 and the flow rate from the third fluid chamber 63 to the second fluid chamber 62 can be controlled in response to the external force F1 serving as vibration input in the axial (vertical) direction to the outer cylinder 34 of the mounts 18 according to the first embodiment. In this manner, the stiffness of the mount 18 in the axial direction can be controlled in a wide range, and thus the transmission of the external force F1 can be controlled.

On the other hand, in response to the external force F2 applied in the shear direction (longitudinal or transverse direction), the flows of the magnetorheological fluid H in the directions around the axis cannot be eliminated or reduced in the axis-perpendicular path 62*b* of the second fluid chamber 62, the first fluid chamber 61, and the third fluid chamber 63 except the axial path 62*a* of the second fluid chamber 62. Thus, the stiffness of the mount 18 according to the first embodiment can be controlled in a limited range.

Second Embodiment

Figure 8:
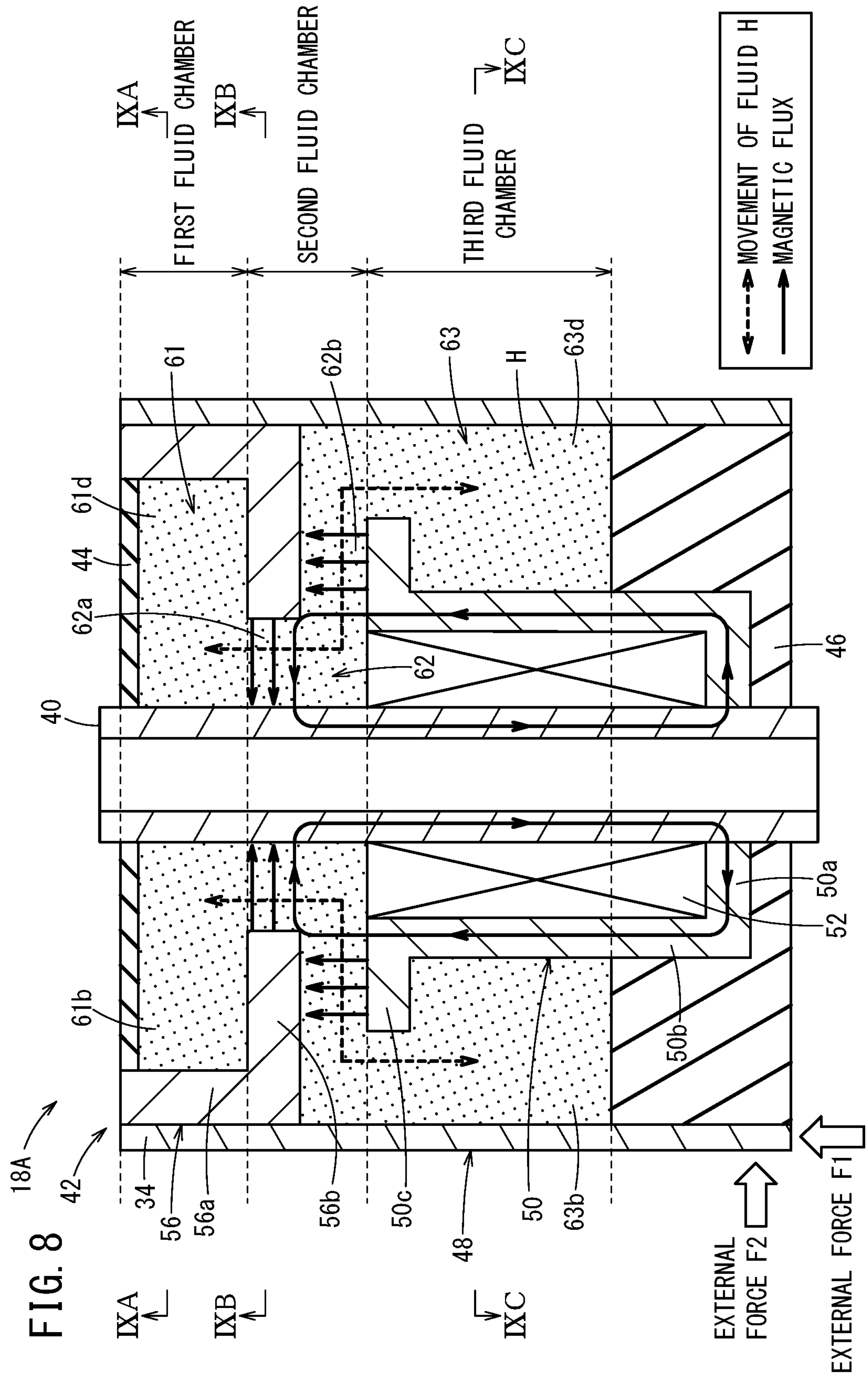
FIG. 8 is a longitudinal sectional view illustrating the structure and effects of a mount for a subframe according to a second embodiment.

FIG. 8 is a longitudinal sectional view illustrating the structure and effects of a mount 18A for a subframe according to a second embodiment capable of eliminating or reducing flows in the directions around the axis in the first fluid chamber 61 and the third fluid chamber 63 in response to the external force F2 applied in the shear direction (longitudinal or transverse direction).

Figure 9A:
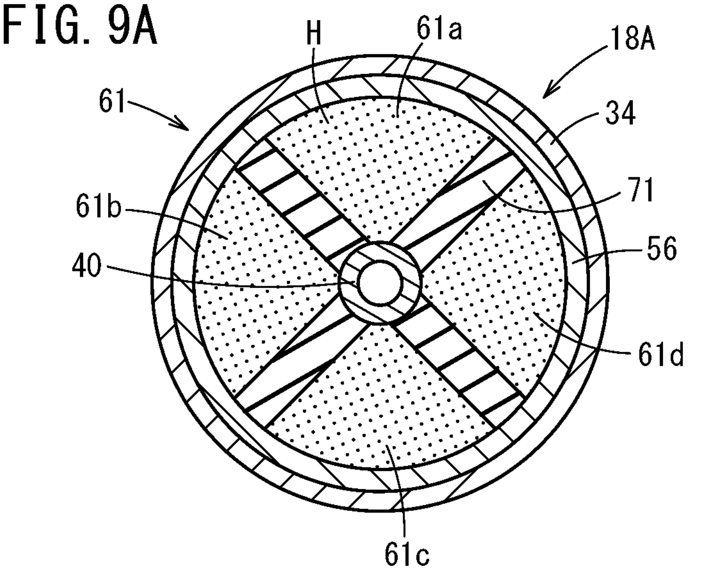
FIG. 9A is a cross-sectional view of a first fluid chamber of the mount for the subframe according to the second embodiment.
Figure 9B:
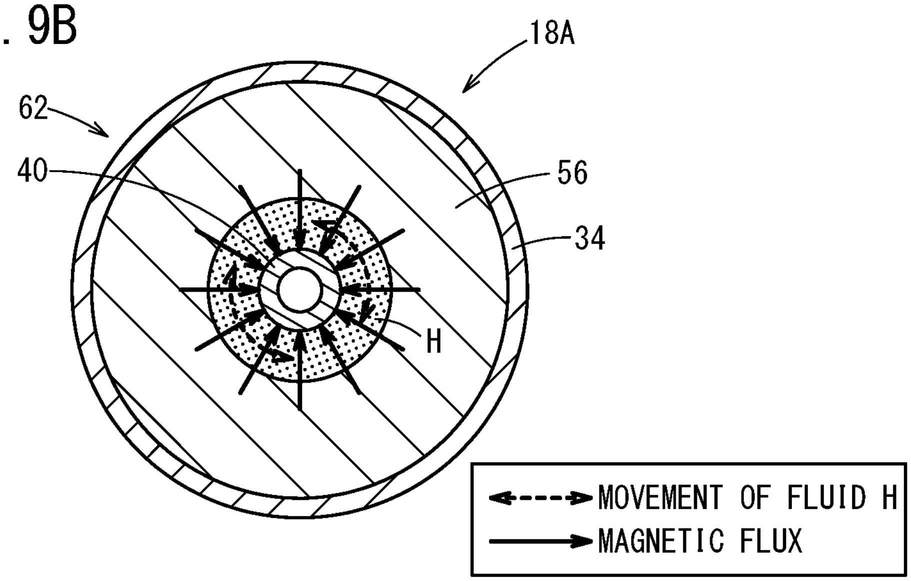
FIG. 9B is a cross-sectional view of a second fluid chamber of the mount for the subframe according to the second embodiment.
Figure 9C:
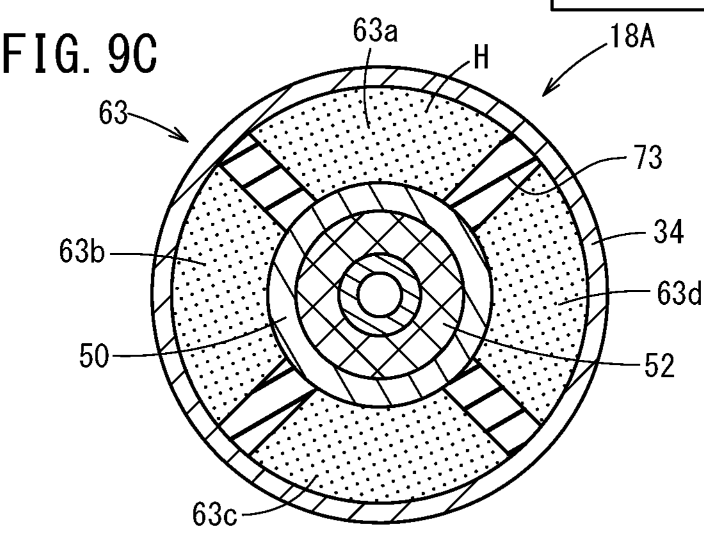
FIG. 9C is a cross-sectional view of a third fluid chamber of the mount for the subframe according to the second embodiment.

FIGS. 9A, 9B, and 9C are cross-sectional views of the first fluid chamber 61 (line IXA-IXA), the second fluid chamber 62 (line IXB-IXB), and the third fluid chamber 63 (IXC-IXC), respectively, of the mount 18A for the subframe illustrated in FIG. 8.

The mount 18A illustrated in FIGS. 8 and 9A to 9C includes a partition rubber plate 71 having an X shape when viewed in the transverse cross section and a partition rubber plate 73 having an X shape when viewed in the transverse cross section. The partition rubber plate 71 partitions the first fluid chamber 61 in a direction around the axis into four chamber sections, first fluid chamber sections 61*a*, 61*b*, 61*c*, and 61*d*, each having a shape of a sector of a hollow cylinder. The partition rubber plate 73 partitions the third fluid chamber 63 in the direction around the axis into four chamber sections, third fluid chamber sections 63*a*, 63*b*, 63*c*, and 63*d*, each having a shape of a sector of a hollow cylinder.

The upper partition rubber plate 71 is disposed between the lower surface of the diaphragm 44 and its upper surface of the annular core portion 56*b*, and the thickness (length in the axial direction) extends vertically (see FIG. 8). In addition, the lower partition rubber plate 73 is disposed between the lower surface of the brim-shaped core portion 50*c* and the upper surface of the main rubber 46, and the thickness (length in the axial direction) extends vertically (see FIG. 8).

The partition rubber plate 71 in the first fluid chamber 61 and the partition rubber plate 73 in the third fluid chamber 63 enable the flows of the magnetorheological fluid H around the axis to be eliminated or reduced in the first fluid chamber 61 and the third fluid chamber 63. Furthermore, application of the magnetic field enables the flows of the magnetorheological fluid H around the axis to be eliminated or reduced in the second fluid chamber 62. Thus, transmission of the external force F2 applied in the shear direction (longitudinal or transverse direction) can be controlled.

Application of the magnetic field enables the flow rates of the magnetorheological fluid H from the first fluid chamber 61 to the second fluid chamber 62 and from the third fluid chamber 63 to the second fluid chamber 62 to be controlled, resulting in an efficient control of the stiffness of the mount 18A in all the directions including the vertical, longitudinal, and transverse directions.

Figure 10:
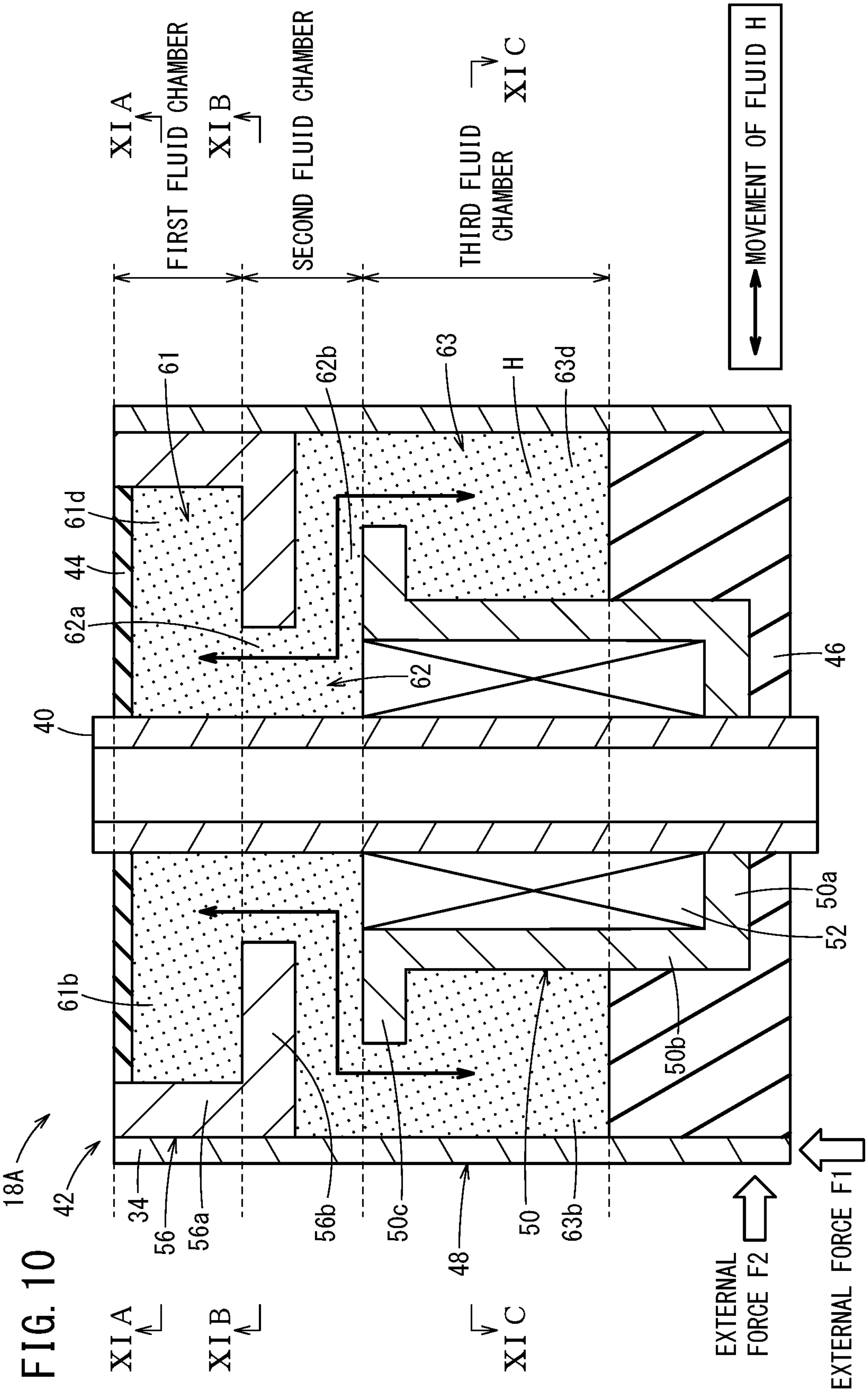
FIG. 10 is a longitudinal sectional view of the mount for the subframe according to the second embodiment in a state where no magnetic field is generated.
Figure 11A:
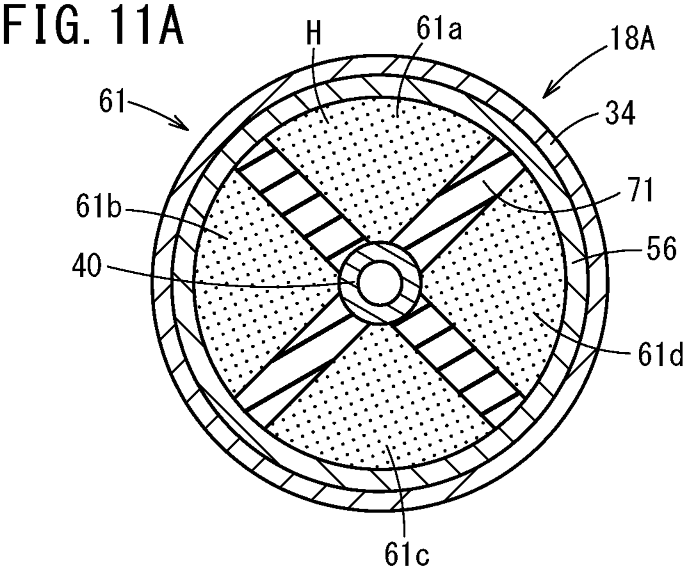
FIG. 11A is a cross-sectional view of the first fluid chamber of the mount for the subframe according to the second embodiment in a state where no magnetic field is generated.
Figure 11B:
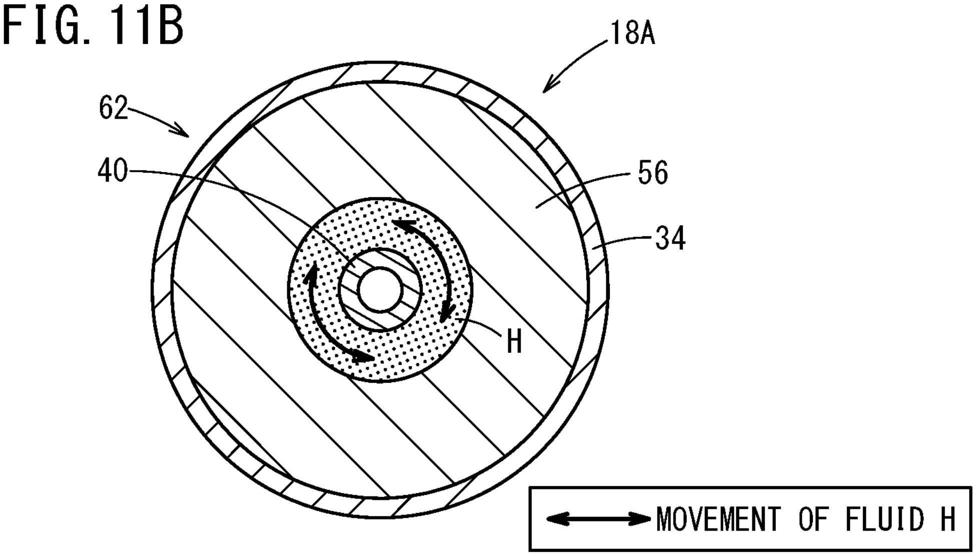
FIG. 11B is a cross-sectional view of the second fluid chamber of the mount for the subframe according to the second embodiment in a state where no magnetic field is generated.
Figure 11C:
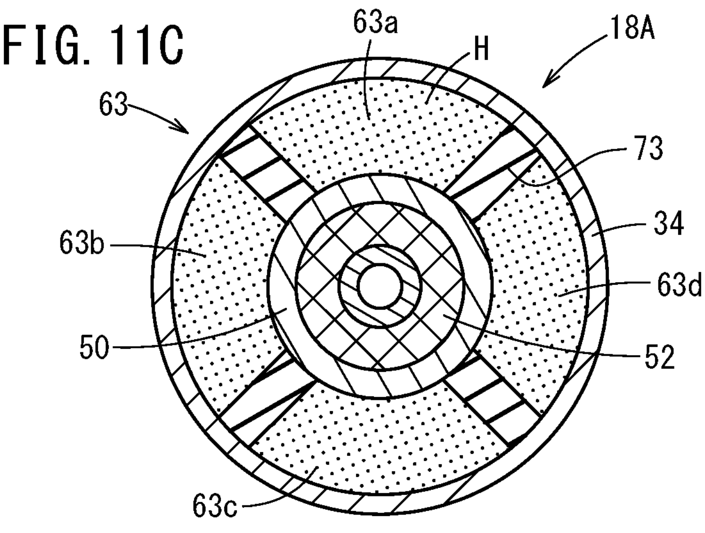
FIG. 11C is a cross-sectional view of the third fluid chamber of the mount for the subframe according to the second embodiment in a state where no magnetic field is generated.

FIG. 10 is a longitudinal sectional view illustrating the flows of the magnetorheological fluid H indicated by solid line arrows in a state where the coil excitation current I is not applied to the exciting coil 52 of the mount 18A for the subframe according to the second embodiment. FIGS. 11A, 11B, and 11C are cross-sectional views of the first fluid chamber 61 (line XIA-XIA), the second fluid chamber 62 (line XIB-XIB), and the third fluid chamber 63 (XIC-XIC), respectively, of the mount 18A for the subframe illustrated in FIG. 10 when the coil excitation current I is not applied to the exciting coil 52, that is, in a state where no magnetic field is generated.

In this case, the magnetorheological fluid H can move freely from the first fluid chamber 61 to the second fluid chamber 62 and from the third fluid chamber 63 to the second fluid chamber 62. As a result, the magnetorheological fluid H can move in the axial (vertical) direction between the first fluid chamber 61 and the third fluid chamber 63 and can move around the axis in the second fluid chamber 62 as illustrated in FIG. 11B. In this manner, the stiffness of the mount 18A can be reduced while the coil excitation current I is not applied.

Third Embodiment

Figure 12:
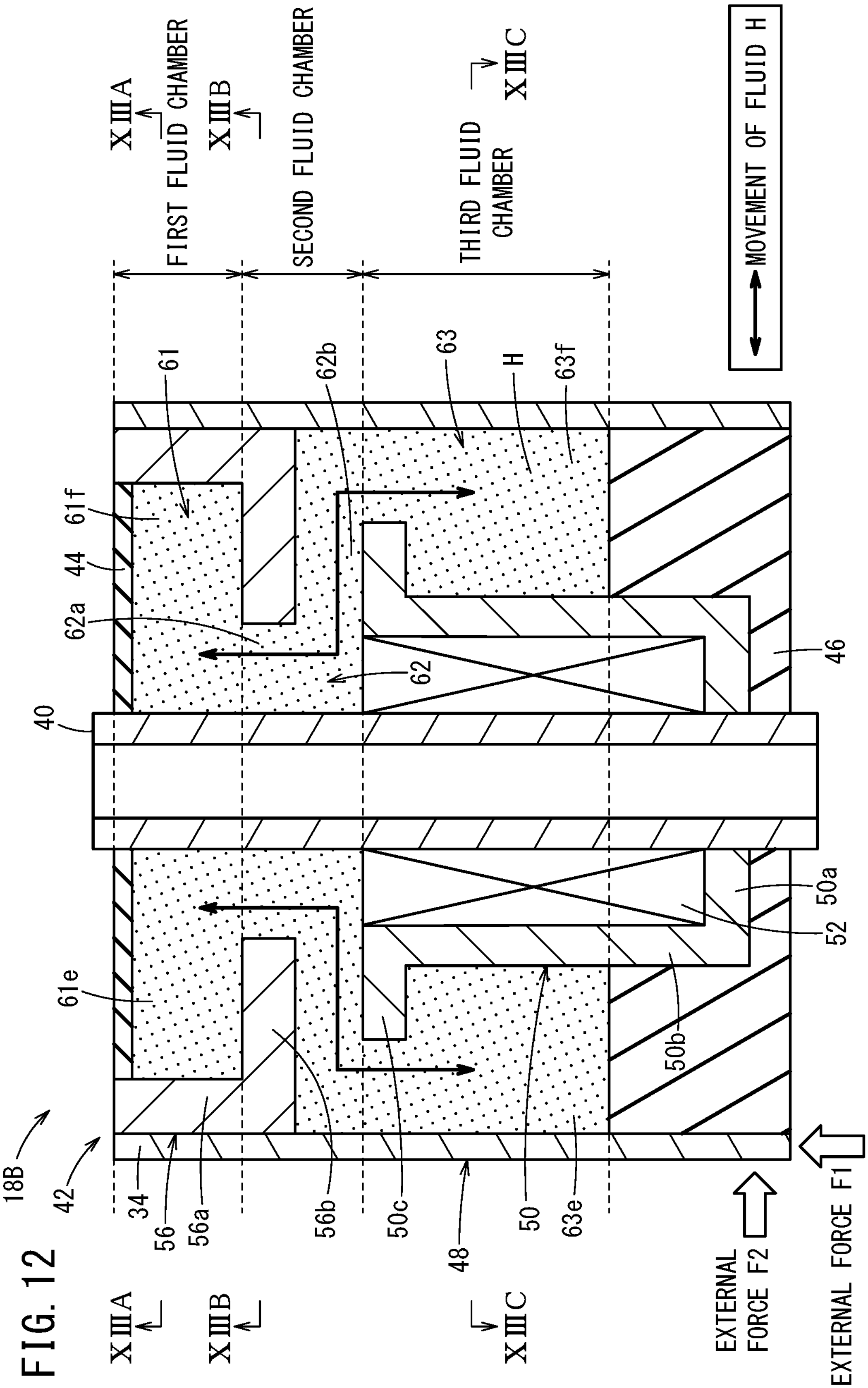
FIG. 12 is a longitudinal sectional view of a mount for a subframe according to a third embodiment in a state where no magnetic field is generated.

FIG. 12 is a longitudinal sectional view illustrating the structure and effects of a mount 18B for a subframe according to a third embodiment capable of eliminating or reducing flows in the directions around the axis in the first fluid chamber 61 and the third fluid chamber 63 in response to the external force F2 applied in the shear direction (longitudinal or transverse direction).

Figure 13A:
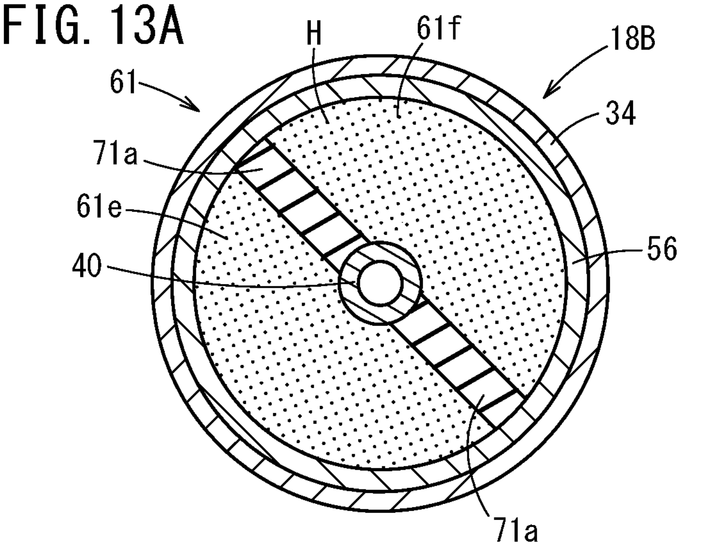
FIG. 13A is a cross-sectional view of the first fluid chamber of the mount for the subframe according to the third embodiment in a state where no magnetic field is generated.
Figure 13B:
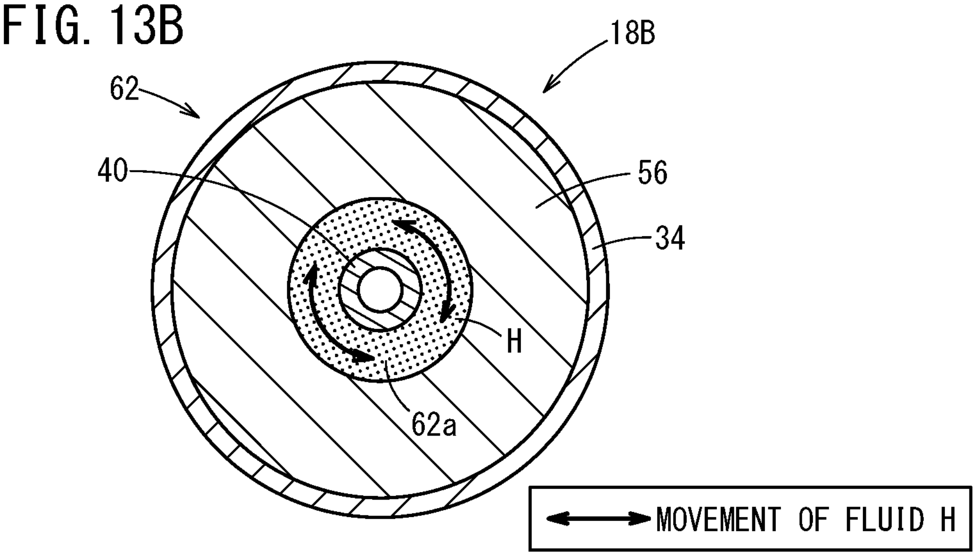
FIG. 13B is a cross-sectional view of the second fluid chamber of the mount for the subframe according to the third embodiment in a state where no magnetic field is generated.
Figure 13C:
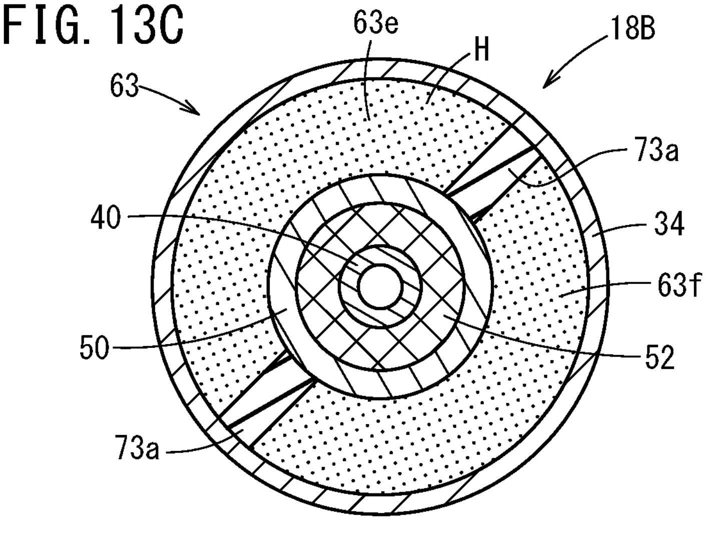
FIG. 13C is a cross-sectional view of the third fluid chamber of the mount for the subframe according to the third embodiment in a state where no magnetic field is generated.

FIGS. 13A, 13B, and 13C are cross-sectional views of first fluid chamber sections 61*e*, 61*f* (line XIIIA-XIIIA), the second fluid chamber 62 (line XIIIB-XIIIB), and third fluid chamber sections 63*e*, 63*f* (XIIIC-XIIIC), respectively, of the mount 18B for the subframe illustrated in FIG. 12.

The mount 18B illustrated in FIGS. 12 and 13A to 13C includes partition rubber plates 71*a* having an I shape when viewed in the transverse cross section and partition rubber plates 73*a* having an I shape when viewed in the transverse cross section. The partition rubber plates 71*a* partition the first fluid chamber 61 in the direction around the axis into two chamber sections (halves), the first fluid chamber sections 61*e*, 61*f*, each having a shape of a sector of a hollow cylinder. The partition rubber plates 73*a* partition the third fluid chamber 63 in the direction around the axis into two chamber sections (halves), the third fluid chamber sections 63*e*, 63*f*, each having a shape of a sector of a hollow cylinder.

The partition rubber plates 71*a*, 71*a* are disposed between the lower surface of the diaphragm 44 and the upper surface of the annular core portion 56*b*, and its thicknesses (lengths in the axial direction) extend vertically (see FIG. 12). In addition, the partition rubber plates 73*a*, 73*a* are disposed between the lower surface of the brim-shaped core portion 50*c* and the upper surface of the main rubber 46, and its thicknesses (lengths in the axial direction) extend vertically (see FIG. 12).

The partition rubber plates 71*a*, 71*a* in the first fluid chamber 61 and the partition rubber plates 73*a*, 73*a* in the third fluid chamber 63 enable the flows of the magnetorheological fluid H around the axis to be eliminated or reduced in the first fluid chamber 61 and the third fluid chamber 63. Furthermore, application of the magnetic field enables the flows of the magnetorheological fluid H around the axis to be eliminated or reduced in the second fluid chamber 62. Thus, transmission of the external force F2 applied in the shear direction (longitudinal or transverse direction) can be controlled.

Application of the magnetic field enables the flow rates of the magnetorheological fluid H from the first fluid chamber 61 to the second fluid chamber 62 and from the third fluid chamber 63 to the second fluid chamber 62 to be controlled, resulting in an efficient control of the stiffness of the mount 18B in all the directions including the vertical, longitudinal, and transverse directions.

In the mount 18B for the subframe illustrated in FIGS. 12 and 13A to 13C, the flows of the magnetorheological fluid H in a state where the coil excitation current I is not applied to the exciting coil 52 are indicated by solid line arrows.

In this case, the magnetorheological fluid H can move freely from the first fluid chamber sections 61*e*, 61*f* to the second fluid chamber 62 and from the third fluid chamber sections 63*e*, 63*f* to the second fluid chamber 62. As a result, the magnetorheological fluid H can move in the axial (vertical) direction between the first fluid chamber sections 61*e*, 61*f* and the third fluid chamber sections 63*e*, 63*f* and can move around the axis in the second fluid chamber 62 as illustrated in FIG. 13B. In this manner, the stiffness of the mount 18B can be kept low by not generating a magnetic field.

Fourth Embodiment

Figure 14:
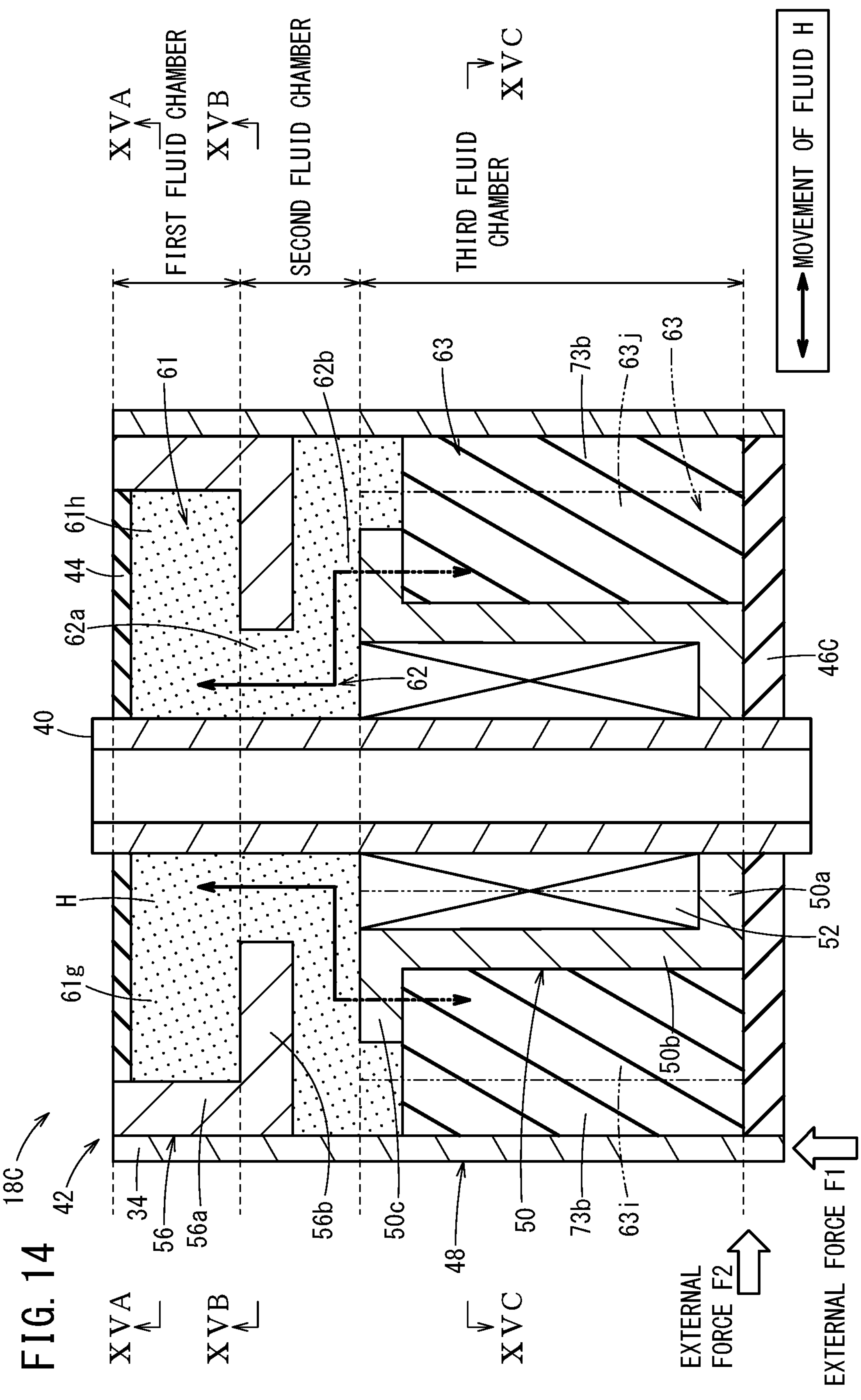
FIG. 14 is a longitudinal sectional view of a mount for a subframe according to a fourth embodiment in a state where no magnetic field is generated.

FIG. 14 is a longitudinal sectional view illustrating the structure and effects of a mount 18C for a subframe according to a fourth embodiment capable of eliminating or reducing flows in the directions around the axis in the first fluid chamber 61 and the third fluid chamber 63 in response to the external force F2 applied in the shear direction (longitudinal or transverse direction).

Figure 15A:
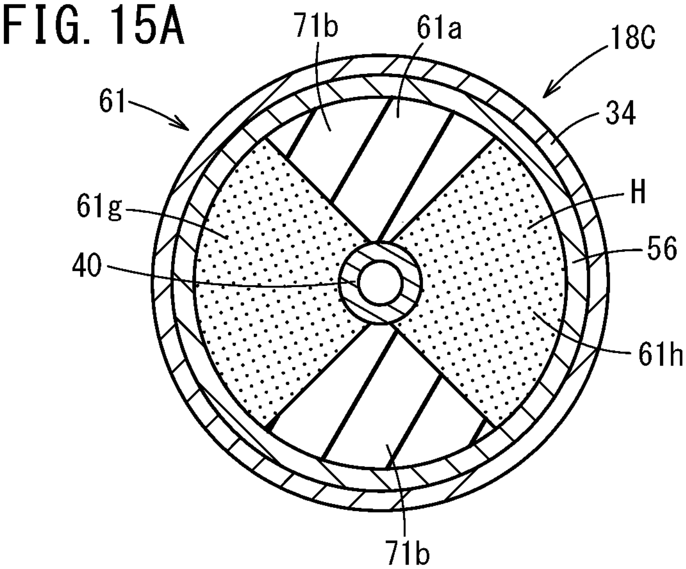
FIG. 15A is a cross-sectional view of the first fluid chamber of the mount for the subframe according to the fourth embodiment in a state where no magnetic field is generated.
Figure 15B:
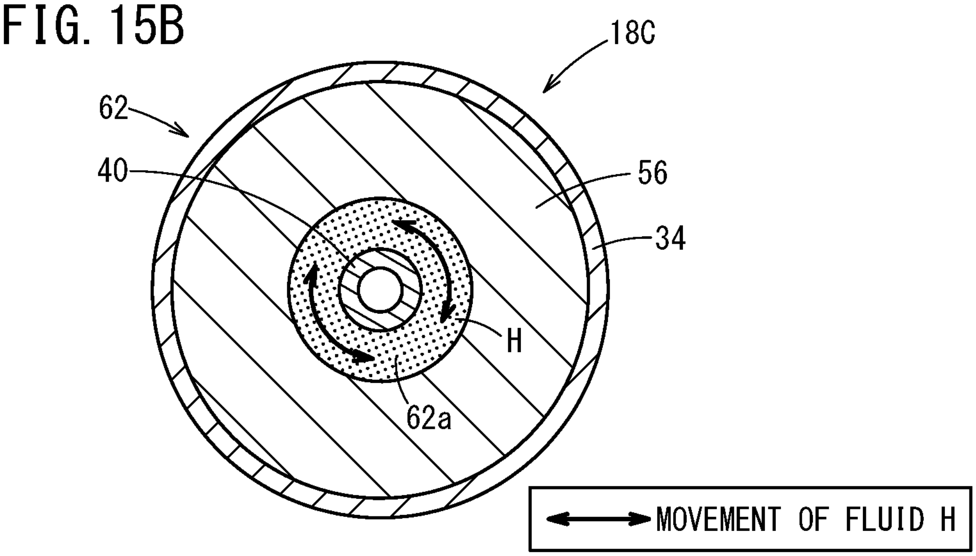
FIG. 15B is a cross-sectional view of the second fluid chamber of the mount for the subframe according to the fourth embodiment in a state where no magnetic field is generated.
Figure 15C:
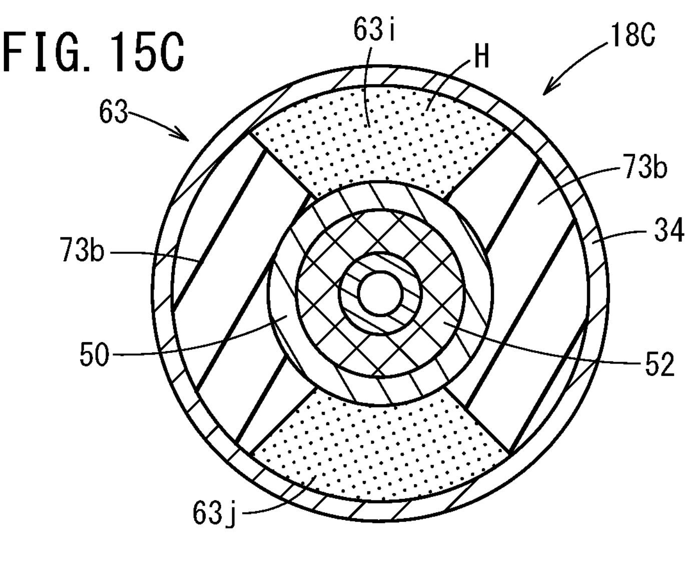
FIG. 15C is a cross-sectional view of the third fluid chamber of the mount for the subframe according to the fourth embodiment when no magnetic field is generated.

FIGS. 15A, 15B, and 15C are cross-sectional views of first fluid chamber sections 61*g*, 61*h* (line XVA-XVA), the second fluid chamber 62 (line XVB-XVB), and third fluid chamber sections 63*i*, 63*j* (XVC-XVC), respectively, of the mount 18C for the subframe illustrated in FIG. 14.

In the mount 18C illustrated in FIGS. 14 and 15A to 15C, a structure corresponding to the main rubber 46 (see FIG. 12 and the like) evenly disposed in the lower portion of the mount in the above-described embodiments has different heights in the axial direction.

More specifically, the mount 18C includes partition rubber plates 71*b* having an annular sector shape when viewed in the transverse cross section and partition rubber plates 73*b* having an annular sector shape when viewed in the transverse cross section. The partition rubber plates 71*b* partition the first fluid chamber 61 in the direction around the axis into two chamber sections, the first fluid chamber sections 61*g*, 61*h*, each having a shape of a sector of a hollow cylinder. The partition rubber plates 73*b* partition the third fluid chamber 63 in the direction around the axis into two chamber sections, the third fluid chamber sections 63*i*, 63*j*, each having a shape of a sector of a hollow cylinder.

The partition rubber plates 71*b*, 71*b* are disposed between the lower surface of the diaphragm 44 and the upper surface of the annular core portion 56*b*, and its thicknesses (lengths in the axial direction) extend vertically. In addition, the partition rubber plates 73*b*, 73*b* are disposed between the lower surface of the brim-shaped core portion 50*c* and the upper surface of a main rubber 46C of which thickness is reduced, and its thicknesses (lengths in the axial direction) of the partition rubber plates 73*b* extend vertically.

The partition rubber plates 71*b* in the first fluid chamber 61 and the partition rubber plates 73*b* in the third fluid chamber 63 enable the flows of the magnetorheological fluid H around the axis to be eliminated or reduced in the first fluid chamber 61 and the third fluid chamber 63. Furthermore, application of the magnetic field enables the flows of the magnetorheological fluid H around the axis to be eliminated or reduced in the second fluid chamber 62. Thus, transmission of the external force F2 applied in the shear direction (longitudinal or transverse direction) can be controlled.

Application of the magnetic field enables the flow rates of the magnetorheological fluid H from the first fluid chamber 61 to the second fluid chamber 62 and from the third fluid chamber 63 to the second fluid chamber 62 to be controlled, resulting in an efficient control of the stiffness of the mount 18C in all the directions including the vertical, longitudinal, and transverse directions.

In the mount 18C for the subframe illustrated in FIGS. 14 and 15A to 15C, the flows of the magnetorheological fluid H in a state where the coil excitation current I is not applied to the exciting coil 52 are indicated by solid line arrows.

In this case, the magnetorheological fluid H can move freely from the first fluid chamber sections 61*g*, 61*h* to the second fluid chamber 62 and from the third fluid chamber sections 63*i*, 63*j* to the second fluid chamber 62. As a result, the magnetorheological fluid H can move in the axial (vertical) direction between the first fluid chamber sections 61*g*, 61*h* and the third fluid chamber sections 63*i*, 63*j* and can move around the axis in the second fluid chamber 62 as illustrated in FIG. 15B. In this manner, the stiffness of the mount 18C can be kept low by not generating a magnetic field.

Fifth Embodiment

Figure 16:
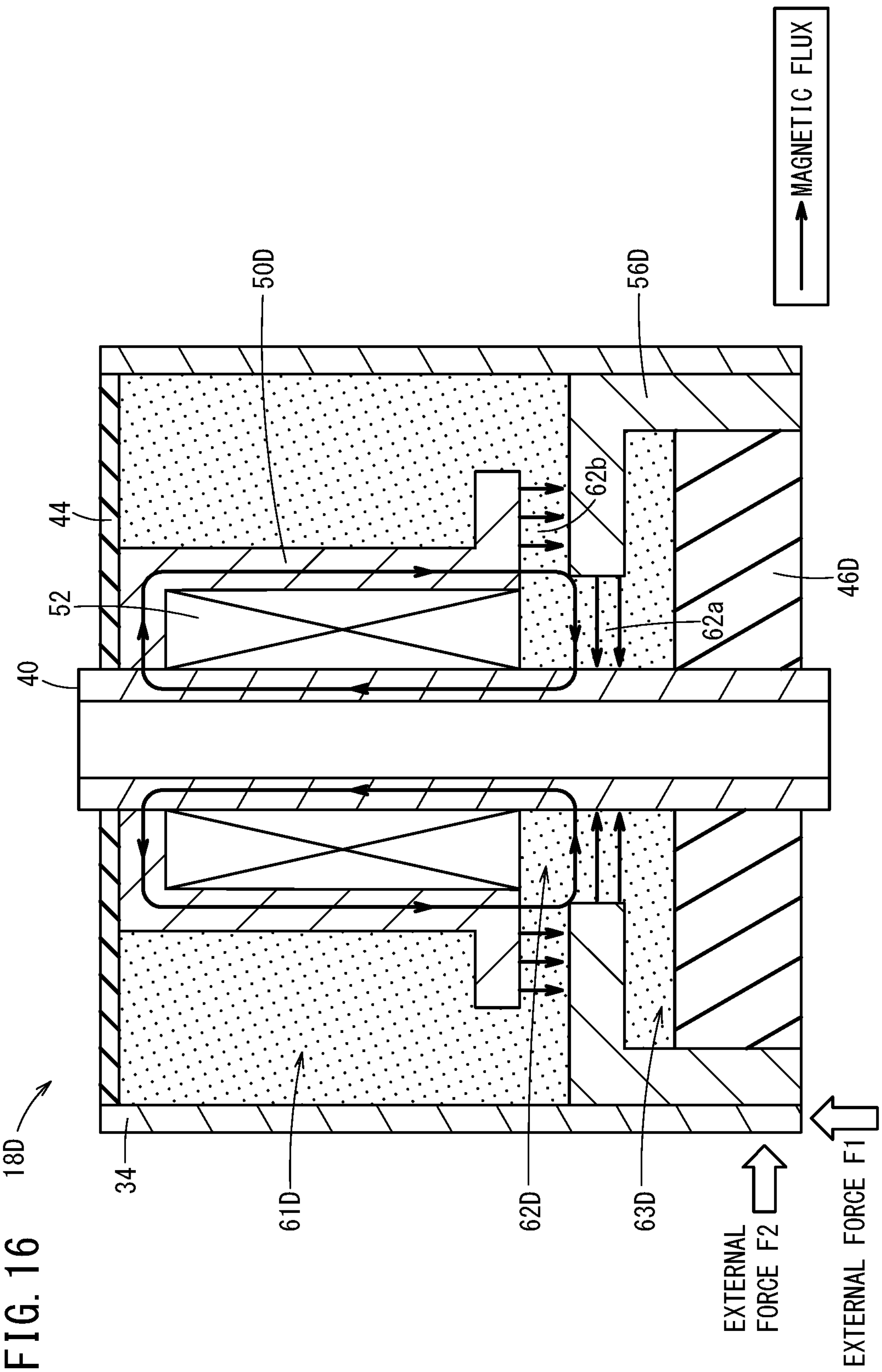
FIG. 16 is a longitudinal sectional view illustrating the structure and effects of a mount for a subframe according to a fifth embodiment.

FIG. 16 is a longitudinal sectional view illustrating the structure and effects of a mount 18D for a subframe according to a fifth embodiment.

The mount 18D includes an inner magnetic core 50D, secured to the inner cylindrical magnetic core 40 and accommodating the exciting coil 52, and an outer magnetic core 56D, secured to the outer cylinder 34 and a main rubber 46D, disposed upside down compared with the inner magnetic core 50 and the outer magnetic core 56 of the mount 18A illustrated in FIG. 8 (FIG. 3), the mount 18B illustrated in FIG. 12, and the mount 18C illustrated in FIG. 14.

Similarly to the mounts 18A to 18C, the stiffness of the mount 18D having the above-described structure can also be controlled in a wide range in response to the external force F1 in the axial (vertical) direction and the external force F2 in the shear direction (longitudinal or transverse direction) applied to the outer cylinder 34 of the mount 18D according to how the magnetic field (magnetic flux) generated by the exciting coil 52 is distributed.

Another Example

Figure 17:
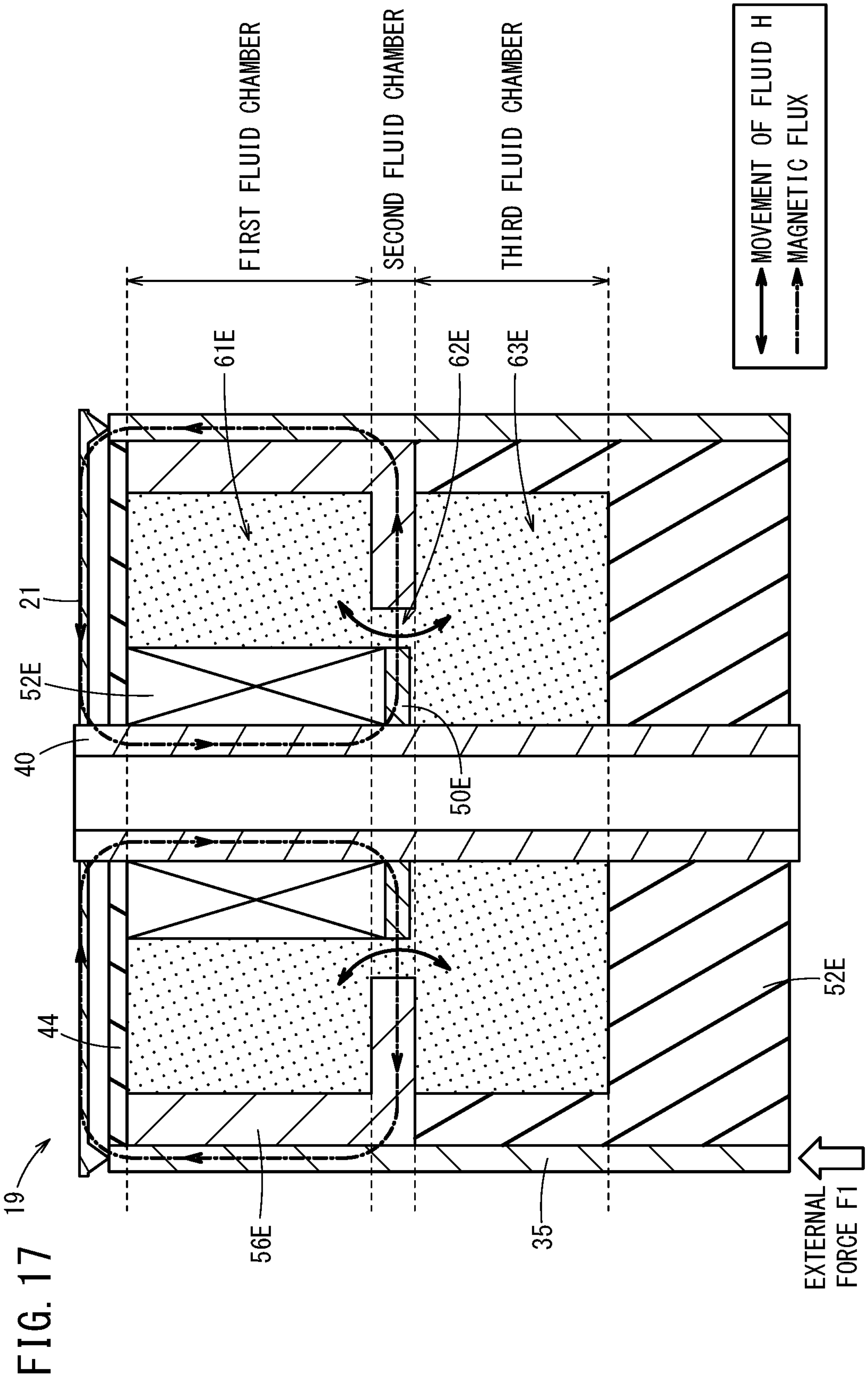
FIG. 17 is a longitudinal sectional view illustrating the structure and effects of a mount for a subframe according to another example.

FIG. 17 is a longitudinal sectional view illustrating the structure and effects of a mount 19 for a subframe according to another example.

In the mount 19, an annular magnetic path plate 21 composed of a magnetic body and provided with a wedge-shaped (when viewed in longitudinal section) annular path around the circumference is disposed at the upper end of the inner cylinder (also referred to as "inner cylindrical magnetic core") 40 composed of a magnetic body using an outer cylinder (also referred to as "outer cylindrical core") 35 composed of a magnetic body.

An exciting coil 52E is wound around the outer circumference of the inner cylinder 40 between the diaphragm 44 and an inner annular core portion 50E composed of a magnetic body and secured to the inner cylinder 40, and the coil excitation current I applied to the exciting coil 52E forms a closed magnetic circuit serving as paths of magnetic flux using the inner cylindrical magnetic core 40, the inner annular core portion 50E, an outer magnetic core 56E, the outer cylinder 35, and the magnetic path plate 21. This prevents the magnetorheological fluid H between a first fluid chamber 61E and a third fluid chamber 63E from flowing in a second fluid chamber 62E in the axial direction, and thus the stiffness can be controlled in response to the external force F1 applied in the axial direction.

CONCLUSION

As described above, the mounts 18 and 18A to 18D for the subframe according to the above-described embodiments are disposed on the subframe 16 at positions where the subframe 16 is supported by the vehicle body (main frame) 12. The mounts 18 and 18A to 18D for the subframe have a cylindrical shape and contain the magnetorheological fluid H in a fluid tight manner.

The mounts 18 and 18A to 18D for the subframe each include the upper fluid chamber (first fluid chamber 61 or 61D) and the lower fluid chamber (third fluid chamber 63 or 63D).

In addition, the mounts 18 and 18A to 18D each include the middle fluid chamber (second fluid chamber 62 or 62D) including the axial path 62*a* extending in the axial direction and the axis-perpendicular path 62*b* extending in the axis-perpendicular directions between the upper fluid chamber (first fluid chamber 61 or 61D) and the lower fluid chamber (third fluid chamber 63 or 63D).

One end of the axial path 62*a* communicates with one of the upper and lower fluid chambers, for example, the first fluid chamber 61. Another end of the axial path 62*a* communicates with one end of the axis-perpendicular path 62*b*. Another end of the axis-perpendicular path 62*b* communicates with the other of the upper and lower fluid chambers, for example, the third fluid chamber 63.

Furthermore, magnetic members (for example, the inner cylindrical magnetic core 40, the inner magnetic core 50, and the outer magnetic core 56) are disposed such that magnetic paths (magnetic flux) passing through the middle fluid chamber, for example, through the axial path 62*a* of the second fluid chamber 62 in the axis-perpendicular directions and through the axis-perpendicular path 62*b* in the axial direction are produced when the coil excitation current I serving as the excitation current is applied to the exciting coil 52 serving as the coil wound about the axis of the mount.

In this manner, the flows of the magnetorheological fluid H inside the mounts 18 and 18A to 18D are controlled to be stopped in the axial direction and in the axis-perpendicular directions by applying the coil excitation current I to the exciting coil 52, and thus the elastic properties of the mounts 18 and 18A to 18D are adjusted such that the mounts are hardened in the axial direction and in the axis-perpendicular directions.

As a result, a variable damping force can be exerted on the external force F1 in the axial (vertical) direction and the external force F2 in the axis-perpendicular direction (longitudinal or transverse direction) applied to the mounts 18 and 18A to 18D.

In addition, the magnetorheological fluid H does not flow between the upper and lower fluid chambers, for example, between the first fluid chamber 61 and the third fluid chamber 63, without passing through the middle fluid chamber, for example, the second fluid chamber 62, in which the magnetic paths are formed. Consequently, the elastic properties of the mounts 18 and 18A to 18D can be efficiently changed by changing the magnitude of the magnetic field of the magnetic paths in the middle fluid chamber, for example, the second fluid chamber 62.

In this case, as illustrated in FIG. 3 and the like, the axial path 62*a* and the axis-perpendicular path 62*b* of the second fluid chamber 62, for example, form a crank-like shape when the mount 18 is viewed in longitudinal section. The magnetic paths in the axis-perpendicular directions are formed radially in the axis-perpendicular directions, and the magnetic paths in the axial direction are formed all around the axis in the entire circumference of the axis.

In this manner, the axial path 62*a* and the axis-perpendicular path 62*b* of the second fluid chamber 62 through which the magnetorheological fluid H passes are symmetrical with respect to the axis, and thus the elastic properties are adjusted to be uniform in the radial direction of the second fluid chamber 62.

In the above-described embodiments, for example, the volume of the second fluid chamber 62 is smaller than the volumes of the first fluid chamber 61 and the third fluid chamber 63, and the formed magnetic paths are compact accordingly. Thus, the elastic properties can be changed while the power efficiency in forming the magnetic paths using the exciting coil 52 is improved.

Furthermore, for example, the diaphragm 44 and the main rubber 46 respectively serving as the first and second elastic members having an annular shape are disposed in upper and lower portions of the mount 18 and hold the magnetorheological fluid H inside the mount 18 in a fluid tight manner. The stiffness of one of the diaphragm 44 and the main rubber 46 is lower than the stiffness of the other. In the above-described embodiments, the stiffness of the diaphragm 44 is lower than the stiffness of the main rubber 46.

Since the stiffness of one of the upper and lower elastic members is lower than the other as described above, the diaphragm 44 expands to absorb the fluid pressures in the first fluid chamber 61 to the third fluid chamber 63 increased by forming the diaphragm 44 and thus prevents the internal pressures in the first fluid chamber 61 to the third fluid chamber 63, that is, the internal pressure in the mount 18 from being increased. This prevents the mount 18 from getting fatigued, leading to a longer life span of the mount 18.

Furthermore, the partition rubber plates 71 and 71*a* respectively illustrated in FIGS. 9A and 13A and the partition rubber plates 73 and 73*a* respectively illustrated in FIGS. 9C and 13C serving as the plurality of partition members radially extend to respectively partition the first fluid chamber 61 and the third fluid chamber 63 into sectors of a hollow cylinder when viewed in perspective (annular sectors when viewed in section). The partition members may be the partition rubber plates 71*b* and 73*b* each having a shape of a sector of a hollow cylinder as illustrated in FIGS. 15A and 15C, respectively.

The partition rubber plates 71, 71*a*, and 71*b* and the partition rubber plates 73, 73*a*, and 73*b* serving as the partition members respectively reduce the ranges of flows of the magnetorheological fluid H in the directions around the axis in the first fluid chamber 61 and the third fluid chamber 63 and direct the flows of the magnetorheological fluid H generated in response to inputs in the axis-perpendicular directions toward the second fluid chamber 62. This enables the viscosity or the stiffness of the mounts 18A, 18B and 18C for the subframe to be changed.

The present invention is not limited to the above-described embodiments and may be applied to various configurations based on the disclosure of this application, for example, suspension bushes connecting suspension links in addition to the mounts 18 (18A to 18D) for the subframe. Moreover, a vehicle may be provided with a mode switch or the like for choosing to form or not to form magnetic paths to be bifunctional to allow a user to choose occupant comfort or steering stability. Furthermore, various structures can be employed based on the description of the specification as a matter of course. For example, occupant comfort is given a higher priority (lower stiffness, no magnetic paths are formed) during normal driving of a self-driving car or the like, and responsiveness is increased (higher stiffness, magnetic paths are formed) in case of emergency to improve the driving performance.

What is claimed is:

1. A mount for a subframe of a vehicle, said mount having a cylindrical shape, containing magnetorheological fluid in a fluid tight manner, and configured to be disposed on the subframe at a position where the subframe is supported by a vehicle body, the mount comprising:
- upper and lower fluid chambers;
- a middle fluid chamber, including an axial path extending in a direction of an axis of the mount and an axis-perpendicular path extending in a direction perpendicular to the axis, the middle fluid chamber being disposed between the upper and lower fluid chambers;
- and a magnetic member,
- wherein:
  - one end of the axial path communicates with one of the upper and lower fluid chambers,
  - another end of the axial path communicates with one end of the axis-perpendicular path, and another end of the axis-perpendicular path communicates with the other of the upper and lower fluid chambers;
  - the magnetic member forms magnetic paths passing through the axial path of the middle fluid chamber in directions perpendicular to the axis, and passing through the axis perpendicular path in the direction of the axis, in a state where excitation current is applied to a coil wound about the axis;
  - and wherein a plurality of partition members extend radially to partition the upper and lower fluid chambers into sectors of a hollow cylinder.

2. A mount for a subframe of a vehicle, said mount having a cylindrical shape and configured to be disposed on the subframe at a position where the subframe is supported by a vehicle body, the mount comprising:
- an inner cylinder including a hollow shaft portion for fastening the mount to the vehicle body;
- an outer cylinder disposed to be coaxial with the inner cylinder;
- a coil having a cylindrical shape and secured adjacent to the inner cylinder; and
- first and second elastic members each having an annular shape, respectively disposed in upper and lower portions of the mount, and holding a magnetorheological fluid inside the mount in a fluid tight manner,
- wherein:
- a first fluid chamber and a third fluid chamber accommodating the magnetorheological fluid are respectively disposed in the upper and lower portions inside the mount;

a second fluid chamber accommodating the magnetorheological fluid is disposed between the first fluid chamber and the third fluid chamber;

the second fluid chamber includes an axial path, extending in a direction of an axis of the mount and communicating with the first fluid chamber, and an axis-perpendicular path, extending in a direction perpendicular to the axis and communicating with the axial path and the third fluid chamber; and a first magnetic member is secured to an outer circumference of the inner cylinder and a second magnetic member is secured to an inner circumference of the outer cylinder such that magnetic paths passing through the axial path of the second fluid chamber in the directions perpendicular to the axis and passing through the axis-perpendicular path in the direction of the axis are formed in a state where excitation current is applied to the coil, and wherein a plurality of partition members extend radially to partition the first fluid chamber and the third fluid chamber into sectors of a hollow cylinder.

3. The mount for the subframe according to claim 2, wherein:

the axial path and the axis-perpendicular path of the second fluid chamber are crank-shaped when the mount is viewed in longitudinal section;

the magnetic paths in the directions perpendicular to the axis are formed radially in the directions perpendicular to the axis; and the magnetic paths in the direction of the axis are formed throughout an entire circumference of the axis.

4. The mount for the subframe according to claim 2, wherein a volume of the second fluid chamber is smaller than a volume of the first fluid chamber and than a volume of the third fluid chamber.

5. The mount for the subframe according to claim 2, wherein a stiffness of one of the first and second elastic members, each having the annular shape, respectively disposed in the upper and lower portions of the mount, and holding the magnetorheological fluid inside the mount in a fluid tight manner, is lower than a stiffness of the other elastic member.

* * * * *